US011451476B2

(12) United States Patent
Shalev et al.

(10) Patent No.: US 11,451,476 B2
(45) **Date of Patent: *Sep. 20, 2022**

(54) MULTI-PATH TRANSPORT DESIGN

(71) Applicant: Amazon Technologies, Inc., Seattle, WA (US)

(72) Inventors: Leah Shalev, Zichron Yaakov (IL); Nafea Bshara, San Jose, CA (US); Georgy Machulsky, San Jose, CA (US); Brian William Barrett, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

This patent is subject to a terminal disclaimer.

(21) Appl. No.: 16/539,303

(22) Filed: Aug. 13, 2019

(65) Prior Publication Data

US 2019/0363989 A1 Nov. 28, 2019

Related U.S. Application Data

(63) Continuation of application No. 14/981,485, filed on Dec. 28, 2015, now Pat. No. 10,498,654.

(51) Int. Cl.
*H04L 47/125* (2022.01)
*G06F 9/448* (2018.01)
(Continued)

(52) U.S. Cl.
CPC .......... *H04L 47/125* (2013.01); *G06F 9/4494* (2018.02); *G06F 9/5005* (2013.01);
(Continued)

(58) Field of Classification Search
CPC ..... H04L 69/22; H04L 12/4633; H04L 45/38; H04L 45/74; H04L 49/3009; H04L 69/16;
(Continued)

(56) References Cited

U.S. PATENT DOCUMENTS 5,699,500 A 12/1997 Dasgupta
6,788,686 B1 9/2004 Khotimsky et al.
(Continued)

FOREIGN PATENT DOCUMENTS

CN 1625179 6/2005
CN 101848203 9/2010
(Continued)

OTHER PUBLICATIONS

JP2018-529606, "Notice of Allowance", dated Mar. 27, 2020, 6 pages.

(Continued)

*Primary Examiner* — Khaled M Kassim
*Assistant Examiner* — Najeeb Ansari
(74) *Attorney, Agent, or Firm* — Weaver Austin Villeneuve & Sampson LLP

(57) ABSTRACT

Disclosed herein is a method including receiving, from a user application, data to be transmitted from a source address to a destination address using a single connection through a network; and splitting the data into a plurality of packets according to a communication protocol. For each packet of the plurality of packets, a respective flowlet for the packet to be transmitted in is determined from a plurality of flowlets; a field in the packet used by a network switch of the network to route the packet is set based on the determined flowlet for the packet; and the packet is sent via the determined flowlet for transmitting through the network.

19 Claims, 15 Drawing Sheets

1200

Receive data to be transmitted from a user application on a source endpoint to a destination endpoint through a network — 1202

Split the data into a plurality of packets according to a communication protocol — 1204

Determine, from a plurality of flowlets, a flowlet for each packet to be transmitted in — 1206

Set, based on the determined flowlet, a field in each packet used by a network switch of the network to route each packet — 1208

Send the packet to a queue of the flowlet for transmitting to the network — 1210

Transmit packets in the queue of each flowlet of the plurality of flowlets to the network fabric through one or more physical ports — 1212

(51) Int. Cl.

| | |
|---|---|
| ***H04L 69/10*** | (2022.01) |
| ***G06F 9/50*** | (2006.01) |
| ***H04L 61/5007*** | (2022.01) |
| ***H04L 65/40*** | (2022.01) |
| ***H04L 43/0823*** | (2022.01) |
| ***H04L 43/0852*** | (2022.01) |
| ***H04L 45/24*** | (2022.01) |
| ***H04L 45/00*** | (2022.01) |
| ***H04L 45/74*** | (2022.01) |
| ***H04L 49/25*** | (2022.01) |
| ***H04L 69/16*** | (2022.01) |
| ***H04L 69/22*** | (2022.01) |
| ***G06F 9/4401*** | (2018.01) |
| ***G06F 8/36*** | (2018.01) |

(52) U.S. Cl.

CPC ...... *H04L 43/0823* (2013.01); *H04L 43/0852* (2013.01); *H04L 45/24* (2013.01); *H04L 45/72* (2013.01); *H04L 45/74* (2013.01); *H04L 49/25* (2013.01); *H04L 61/5007* (2022.05); *H04L 65/40* (2013.01); *H04L 69/10* (2013.01); *H04L 69/16* (2013.01); *H04L 69/22* (2013.01); *G06F 8/36* (2013.01); *G06F 9/4411* (2013.01)

(58) Field of Classification Search

CPC ....... H04L 45/64; H04L 45/745; H04L 49/70; H04L 45/00; H04L 45/02; H04L 47/2441; H04L 45/24

See application file for complete search history.

(56) References Cited

U.S. PATENT DOCUMENTS

| | | | | |
|---|---|---|---|---|
| 6,990,528 | B1 | 1/2006 | Neal et al. | |
| 7,088,718 | B1 | 8/2006 | Srivastava | |
| 7,171,484 | B1 | 1/2007 | Krause et al. | |
| 7,912,064 | B2 | 3/2011 | Elzur | |
| 7,913,077 | B2 | 3/2011 | Ko et al. | |
| 8,031,729 | B2 | 10/2011 | Elzur | |
| 8,190,960 | B1 | 5/2012 | Bahadur et al. | |
| 9,654,385 | B2 | 5/2017 | Chu et al. | |
| 9,667,723 | B2 | 5/2017 | Pandya | |
| 9,747,249 | B2 | 8/2017 | Cherian et al. | |
| 9,985,903 | B2 | 5/2018 | Shalev et al. | |
| 9,985,904 | B2 | 5/2018 | Shalev et al. | |
| 10,148,570 | B2 | 12/2018 | Shalev et al. | |
| 10,375,167 | B2 | 8/2019 | Shamis et al. | |
| 10,430,373 | B2 | 10/2019 | Cherian et al. | |
| 10,498,654 | B2 | 12/2019 | Shalev et al. | |
| 10,645,019 | B2 | 5/2020 | Shalev et al. | |
| 10,673,772 | B2 | 6/2020 | Shalev et al. | |
| 10,917,344 | B2 | 2/2021 | Shalev et al. | |
| 2002/0198927 | A1 | 12/2002 | Craddock et al. | |
| 2003/0031183 | A1 | 2/2003 | Kashyap et al. | |
| 2003/0035433 | A1 | 2/2003 | Craddock et al. | |
| 2003/0053457 | A1 | 3/2003 | Fox et al. | |
| 2004/0003126 | A1 | 1/2004 | Boucher et al. | |
| 2004/0042458 | A1 | 3/2004 | Elzu | |
| 2004/0042483 | A1 | 3/2004 | Elzur et al. | |
| 2004/0044796 | A1 | 3/2004 | Vangal et al. | |
| 2004/0049612 | A1 | 3/2004 | Boyd et al. | |
| 2004/0049774 | A1 | 3/2004 | Boyd et al. | |
| 2005/0060442 | A1 | 3/2005 | Beverly et al. | |
| 2005/0144310 | A1 | 6/2005 | Biran et al. | |
| 2005/0180327 | A1 | 8/2005 | Banerjee et al. | |
| 2006/0007935 | A1 | 1/2006 | Bennett et al. | |
| 2006/0075067 | A1 | 4/2006 | Blackmore et al. | |
| 2006/0101090 | A1 | 5/2006 | Aloni et al. | |
| 2006/0101225 | A1 | 5/2006 | Aloni et al. | |
| 2006/0168274 | A1 | 7/2006 | Aloni et al. | |
| 2007/0208820 | A1 | 9/2007 | Makhervaks et al. | |
| 2008/0043750 | A1 | 2/2008 | Keels et al. | |
| 2009/0106771 | A1 | 4/2009 | Benner et al. | |
| 2009/0219939 | A1* | 9/2009 | Isosaari | H04L 69/161 370/400 |
| 2009/0222564 | A1 | 9/2009 | Freimuth et al. | |
| 2011/0280247 | A1 | 11/2011 | Roskind | |
| 2012/0023304 | A1 | 1/2012 | Chan et al. | |
| 2012/0089694 | A1 | 4/2012 | Pandya | |
| 2012/0155458 | A1 | 6/2012 | Larson et al. | |
| 2012/0155468 | A1 | 6/2012 | Greenberg et al. | |
| 2012/0265837 | A1 | 10/2012 | Grant et al. | |
| 2012/0281714 | A1 | 11/2012 | Chang et al. | |
| 2012/0287944 | A1 | 11/2012 | Pandit et al. | |
| 2013/0051222 | A1 | 2/2013 | Gavrilov et al. | |
| 2013/0080561 | A1 | 3/2013 | Fox et al. | |
| 2013/0145035 | A1 | 6/2013 | Pope et al. | |
| 2013/0268980 | A1 | 10/2013 | Russell | |
| 2013/0304796 | A1 | 11/2013 | Jackowski et al. | |
| 2014/0052808 | A1 | 2/2014 | Krishnan et al. | |
| 2014/0153572 | A1* | 6/2014 | Hampel | H04L 45/64 370/392 |
| 2014/0310369 | A1 | 10/2014 | Makhervaks et al. | |
| 2014/0358972 | A1 | 12/2014 | Guarrieri et al. | |
| 2015/0010090 | A1 | 1/2015 | Sugimoto | |
| 2015/0052280 | A1 | 2/2015 | Lawson | |
| 2015/0124652 | A1 | 5/2015 | Dharmapurikar et al. | |
| 2015/0127797 | A1 | 5/2015 | Attar et al. | |
| 2015/0163144 | A1 | 6/2015 | Koponen et al. | |
| 2015/0172226 | A1 | 6/2015 | Borshteen et al. | |
| 2015/0179227 | A1 | 6/2015 | Russell | |
| 2015/0263932 | A1 | 9/2015 | Chunduri et al. | |
| 2015/0373165 | A1 | 12/2015 | Anand et al. | |
| 2016/0026604 | A1 | 1/2016 | Pandit et al. | |
| 2016/0094356 | A1 | 3/2016 | Xiang et al. | |
| 2016/0212214 | A1 | 7/2016 | Rahman et al. | |
| 2016/0226755 | A1* | 8/2016 | Hammam | H04L 12/4633 |
| 2016/0234127 | A1 | 8/2016 | Agarwal et al. | |
| 2016/0344633 | A1 | 11/2016 | Jiao et al. | |
| 2017/0006142 | A1* | 1/2017 | Kwon | H04L 12/4633 |
| 2017/0134535 | A1* | 5/2017 | Osamura | H04L 69/16 |
| 2017/0187496 | A1 | 6/2017 | Shalev | |
| 2017/0187629 | A1 | 6/2017 | Shalev et al. | |
| 2017/0187846 | A1 | 6/2017 | Shalev | |
| 2017/0195240 | A1 | 7/2017 | Chen et al. | |
| 2017/0223154 | A1* | 8/2017 | Hammam | H04L 47/125 |
| 2017/0346742 | A1 | 11/2017 | Shahar et al. | |
| 2018/0004705 | A1 | 1/2018 | Menachem et al. | |
| 2018/0219980 | A1 | 8/2018 | McCulley et al. | |
| 2020/0259759 | A1 | 8/2020 | Shalev et al. | |

FOREIGN PATENT DOCUMENTS

| | | |
|---|---|---|
| CN | 103929492 | 7/2014 |
| CN | 103986647 | 8/2014 |
| CN | 104541257 | 4/2015 |
| CN | 104620664 | 5/2015 |
| JP | 2002305535 | 10/2002 |
| JP | 2004531175 | 10/2004 |
| JP | 2005524264 | 8/2005 |
| JP | 2008507201 | 3/2008 |
| JP | 2015050746 | 3/2015 |
| WO | 2013169073 | 11/2013 |

OTHER PUBLICATIONS

Notice of Allowance, dated Dec. 1, 2020, CN 201680076623.4.

Notice of Allowance, dated Jan. 13, 2021, EP 16826649.2.

KR10-2018-7021415, "Notice of Decision to Grant," dated Oct. 30, 2019, 4 pages.

U.S. Appl. No. 14/981,485, "Corrected Notice of Allowability," dated Oct. 29, 2019, 2 pages.

U.S. Appl. No. 14/981,485, "Corrected Notice of Allowability," dated Aug. 20, 2019, 3 pages.

EP App. No. EP16826649.2, "Office Action," dated Aug. 9, 2019, 4 pages.

Office Action dated Aug. 26, 2020 in CA 3,008,896.

First Examination Report dated Oct. 19, 2020 in IN 201817027666.

Written Opinion dated Sep. 16, 2020 in SG 11201804983X.

"Open Fabrics Interfaces", Working Group. Libfabric Programmer's Manual: Libfabric OpenFabrics. [online], OpenFabrics Inter-

(56) References Cited

OTHER PUBLICATIONS faces Working Group, Retrieved from the internet: <URL:http://ofiwg.github.io/libfabric, Dec. 29, 2015, 6 pages.
"Open Fabrics Software", OFED Overview, [online]. Open Fabrics Alliance, Available online at : https://www.openfabrics.org/index.php/openfabrics-software.html, Sep. 7, 2015, 2 pages.
U.S. Appl. No. 14/981,485 , "Final Office Action", dated Jun. 27, 2018, 24 pages.
U.S. Appl. No. 14/981,485 , "Non-Final Office Action", dated Jan. 11, 2019, 21 pages.
U.S. Appl. No. 14/981,485 , "Non-Final Office Action", dated Nov. 30, 2017, 21 pages.
U.S. Appl. No. 14/981,485 , "Notice of Allowance", dated May 15, 2019, 8 pages.
AU2016382945 , "First Examination Report", dated Mar. 12, 2019, 3 pages.
AU2016382945 , "Second Examination Report", dated Jun. 20, 2019, 4 pages.
Bryant et al., "Pseudowire Emulation Edge-to-Edge (PWE3) Control Word for Use over an MPLS PSN", XP015044817, Feb. 1, 2006.
JP2018-529606 , "Office Action", dated Jul. 8, 2019, 7 pages.
KR1020187021415 , "Office Action", dated May 29, 2019, 5 pages.
PCT/US2016/068941 , "International Search Report and Written Opinion", dated Mar. 17, 2017, 13 pages.
Russell , "Introduction to RDMA Programming", University of New Hampshire InterOperability Laboratory, Available online at: http://www.cs.unh.edu/~rdr/rdma-intro-module.ppt, 2012, 76 pages.
CA3,008,896, "Office Action," dated Mar. 20, 2019, 4 pages.
SG11201804983X, "Written Opinion," dated Jan. 3, 2020, 6 pages.
Notice of Allowance, dated May 10, 2021, CA 3,008,896.
U.S. Appl. No. 16/712,589, dated Dec. 12, 2019, Shalev et al.
Application No. BR112018013313-2, Office Action, dated Jul. 21, 2020, 6 pages.
Application No. CN201680076623.4, Office Action, dated Jul. 1, 2020, 16 pages.
Notice of Allowance, dated Sep. 28, 2021; SG 11201804983X.

* cited by examiner

MULTI-PATH TRANSPORT DESIGN

CROSS REFERENCE TO RELATED APPLICATIONS

This application is a continuation of U.S. patent application Ser. No. 14/981,485, filed Dec. 28, 2015, issued as U.S. Pat. No. 10,498,654 on Dec. 3, 2019, and titled "MULTI-PATH TRANSPORT DESIGN," the content of which is incorporated herein by reference in its entirety.

BACKGROUND

In network environments such as a data center, data traffic between one node and another node could be very heavy. Thus, high speed data connections, such as InfiniBand (IB), Gigabit Ethernet, or fiber channel, are designed to handle the heavy data traffic. However, with ever increasing amount of data and thus bandwidth and throughput demand for the connections, even these high speed data connections may be overloaded, causing congestions in the network. It is therefore desirable to further improve the throughput of data transfer over a network and avoid network congestion by better utilizing the available network capacity.

BRIEF DESCRIPTION OF THE DRAWINGS

Various embodiments in accordance with the present disclosure will be described with reference to the drawings, in which.

DETAILED DESCRIPTION

Figure 1:
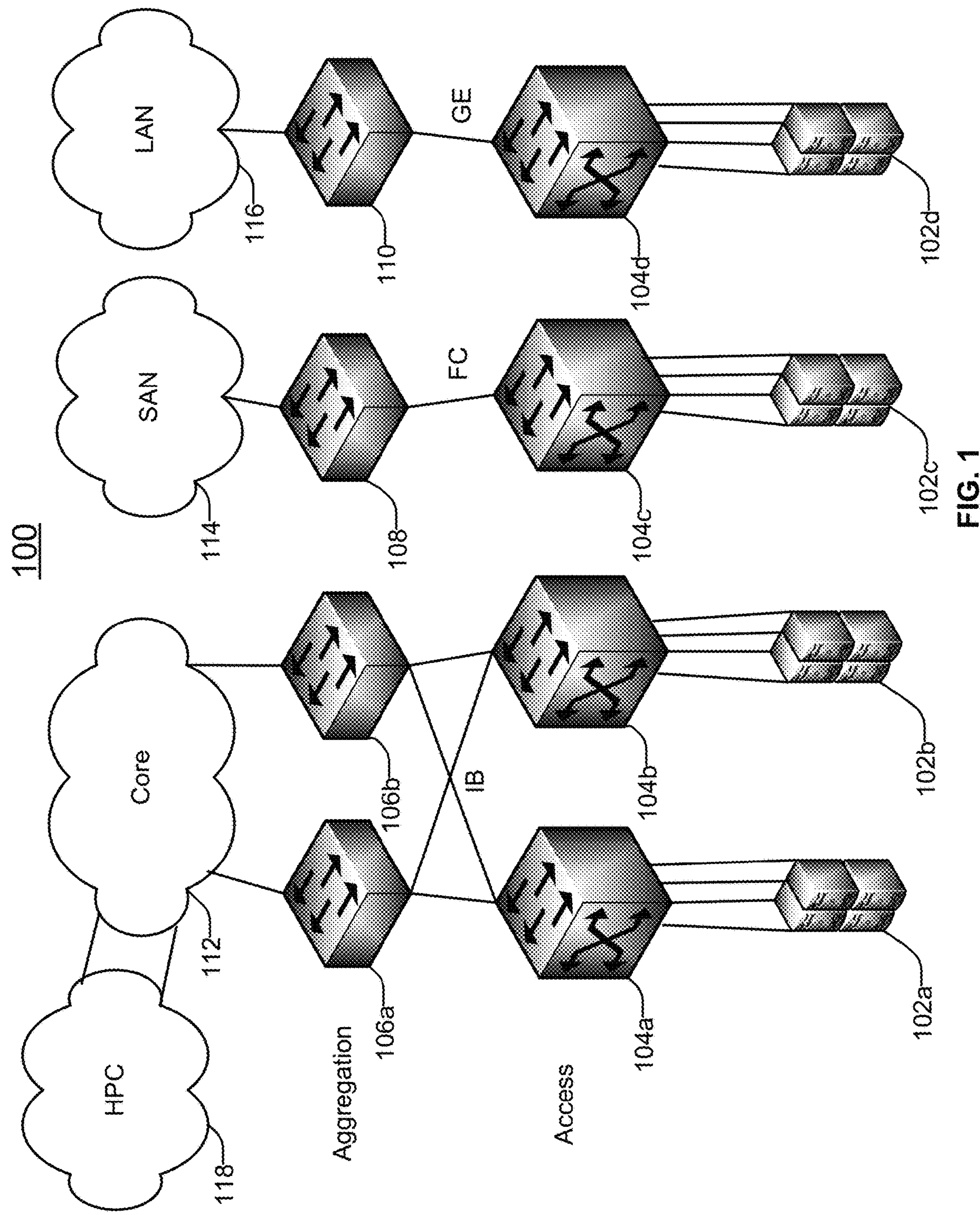
FIG. 1 illustrates an example network architecture for a data center environment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As used herein, a flow or a data flow generally refers to a stream of associated data packets, in some cases, traversing the network in order. A user application on a source endpoint may desire to send a user application data stream to a destination endpoint through a network. The data may be one or more messages, one or more commands, or one or more transactions. In some cases, the source endpoint and the destination endpoint may each have a unique IP address. In such cases, a user application data stream intended to be transferred from a source IP address to a destination IP address in a single TCP or UDP connection may be referred to as a data flow or a flow. In some other cases, multiple endpoints may share an IP address, and user application data streams between endpoints can thus be multiplexed in an IP-level data stream between a pair of source and destination IP addresses. In these cases, user application data streams from the multiple endpoints intended to be transferred from a source IP address to a destination IP address in a single TCP or UDP connection may be referred to as a data flow or a flow, where the source IP address is shared by multiple endpoints. In some other cases, an endpoint may have multiple IP addresses and a user application data stream may be intended to be sent through multiple paths using the multiple IP address. In these cases, each part of the user application data stream, which is intended to be transferred from a source IP address to a destination IP address in a single TCP or UDP connection, may be referred to as a data flow or a flow.

As also used herein, a path generally refers to a route that a data packet takes through a network between two IP addresses. A flowlet generally refers to a group of packets associated with a flow or a data flow transferred over a single path.

Embodiments of the present disclosure provide methods and systems for high speed data transports that can balance load among various paths in a network environment, such as a data center environment, and support equal cost multipath (ECMP) routing, such that better utilization of the capacity of a network for applications, such as data center, high-performance computing (HPC), storage area network (SAN), or local area network (LAN), can be achieved.

Some or all of the methods may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Techniques described herein include splitting a data flow between two endpoints or two IP addresses into a plurality of flowlets that each take different paths through a network, by manipulating a field in the data packet header, such as assigning different source ports in the packet header for some packets of the data flow, so that the packets may be routed to different physical ports of a switch and take different paths through a switched network fabric without using different IP address. The number of flowlets and the number of packets in a flowlet may be controlled to avoid overloading a path or a node in the network. The data flow splitting may be done at a network interface card or a network adapter device such that user applications or a host may not need to be aware of the splitting. The packets can be delivered to a destination endpoint in order or out-of-order. Packets received by the destination endpoint from different flowlets may be reordered or reassembled by applications at the destination endpoint based on information in the packet header.

I. High Speed Network

The following section describes various embodiments of the present disclosure in an example environment, such as a data center. It is understood that the methods and systems described herein may be used in any other applications involving data communication through a switch fabric in a network.

A data center generally includes many servers arranged into standardized assemblies (racks) to make efficient use of space and other resources. Each rack may include a plurality of servers, such as 16, 32, 64 or more severs. The interconnects between servers of the same rack and servers from different racks can be accomplished through one or more switch fabrics. The switch fabric may include an access layer, an aggregation layer, and a core layer. The access layer may include devices, such as switches, directly connected to servers either in the same rack (top of rack, or ToR) or at the end of the row (EoR). The aggregation layer may include devices, such as switches, that aggregate access layer devices to provide connectivity among access layer domains. The core layer may include devices, such as routers, that interconnect multiple aggregation layer devices either within a data center or across geographic locations with outside world.

High-performance computing, big data, Web 2.0 and search applications depend on managing, understanding and responding to massive amounts of user-generated data in real time. With more users feeding more applications and platforms, the data is no longer growing arithmetically, it is growing exponentially. To keep up with the growing of data, data centers need to grow as well, in both data capacity and the speed that data can be accessed and analyzed. Scalable data centers today generally include parallel infrastructures, both in hardware configurations (clusters of computers and storage) and in software configurations, and adopt the most scalable, energy-efficient, high-performing interconnect infrastructure.

FIG. 1 illustrates an example network architecture 100 for a data center environment. Network architecture 100 may include a plurality of data center servers 102*a*-102*d* and one or more switch fabrics for various data center interconnects. For example, as illustrated in FIG. 1, servers 102*a*-102*d* may transfer data to or from a high-performance computing (HPC) cluster 118, a local area network (LAN) 116, or a storage area network (SAN) 114.

Each of servers 102*a*-102*d* may be connected with an access layer switch 104*a*, 104*b*, 104*c*, or 104*d*. Each access layer switch may have a plurality of physical ports such that data may come in at different input ports and be switched to different output ports. For redundancy in case of an access layer switch failure, the network architecture for a data center environment may also include redundant servers and access layer switches (not shown). Communication paths between servers 102*a*-102*d* and the access layer switches 104*a*-104*d* may support data center bridging or separate channels, such as InfiniBand, Data Center Ethernet (DCE), gigabit Ethernet, fiber channel, or fiber channel over Ethernet (FCoE).

Access layer switches 104*a*-104*d* may be connected with aggregation layer switches at the aggregation layer. Again, at least two aggregation layer switches for each network cloud may be used for redundancy in case of a switch failure. For example, aggregation layer switches 106*a* and 106*b* may be HPC-compatible for routing between access layer switches 104*a* and 104*b* and HPC 118 through, for example, a core layer 112. The communication paths between access layer switches 104*a* and 104*b* and aggregation layer switches 106*a* and 106*b* may be InfiniBand connections for fast data transfer. Aggregation layer switch 108 may be used to route data between access layer switches 104*c* and SAN 114. The communication paths between access layer switch 104*c* and aggregation layer switches 108 and SAN 114 may be Fiber channels (FCs). Aggregation layer switch 110 may provide for routing between access layer switches 104*d* and LAN 116. Gigabit Ethernet or Data Center Ethernet may be used to connect access layer switch 104*d* with aggregation layer switch 110 and LAN 116.

An HPC system performs advanced computation over parallel processing, enabling faster execution of highly computation intensive tasks, such as climate research, molecular modeling, physical simulations, cryptanalysis, geophysical modeling, automotive and aerospace design, financial modeling, and data mining. The execution time of a given computation depends upon many factors, such as the number of central processing unit (CPU) or graphic processing unit (GPU) cores and their utilization factors, and the interconnect performance, efficiency, and scalability. Efficient HPC systems generally employ high-bandwidth, low-latency connections between thousands of multi-processor nodes and high-speed storage systems.

InfiniBand (IB) is a computer-networking communication standard with very high throughput and very low latency used in high-performance computing. It can be used for data interconnect both among and within computers or servers. InfiniBand can also be used as either a direct or a switched interconnect between servers and storage systems. Features of InfiniBand, such as zero-copy and Remote Direct Memory Access (RDMA), help reduce processor overhead by directly transferring data from a sender's memory to a receiver's memory without involving host processors. IB interface can also be used in RDMA over Ethernet (RoCE), which uses a different low-level infrastructure than InfiniBand and is more scalable than InfiniBand.

The InfiniBand architecture defines a switched network fabric for interconnecting processing nodes, storage nodes, and I/O nodes. An InfiniBand network may include switches, adapters, such as Host Channel Adapters (HCAs) or target channel adapters (TCAs), and links for communication. For communication, InfiniBand supports several different classes of transport services (Reliable Connection, Unreliable Connection, Reliable Datagram, and Unreliable Datagram).

Figure 2:
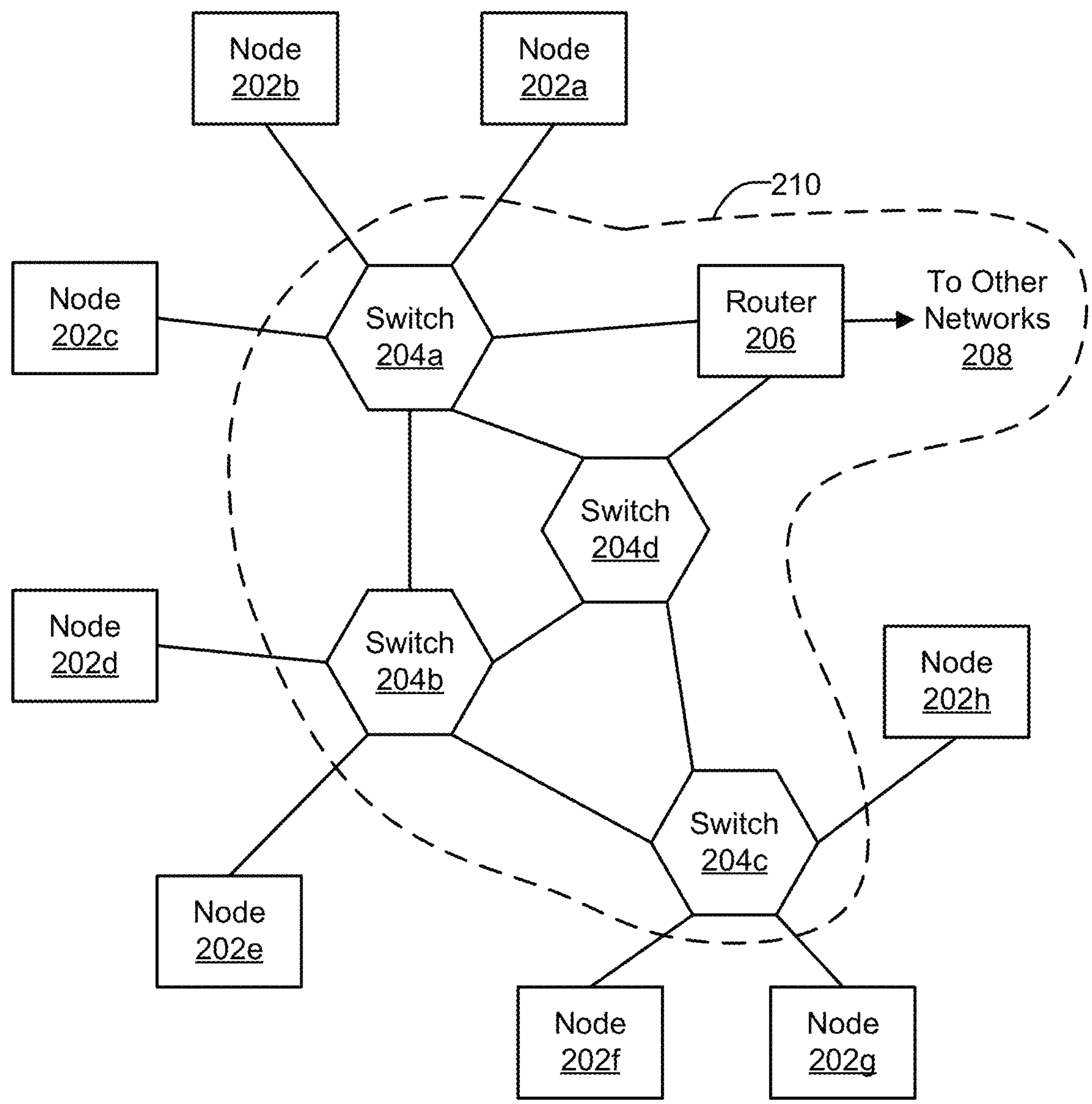
FIG. 2 illustrates a high performance computing (HPC) environment.

FIG. 2 illustrates a high-performance computing (HPC) environment 200 using an InfiniBand fabric 210. InfiniBand fabric 210 is based on a switched fabric architecture of serial point-to-point links, where InfiniBand links can be connected to either host channel adapters (HCAs), used primarily in servers or processor nodes, or target channel adapters (TCAs), used primarily in storage subsystems or I/O chassis. As illustrated in FIG. 2, InfiniBand fabric 210 includes a plurality of switches 204*a*-204*d*, which may be arranged in a layered network, such as a fat-tree network or Clos network. Switches 204_a_-204_d_ may be connected to a plurality of nodes 202_a_-202_h_ and provide multiple paths between any two nodes. In some cases, the number of paths between two nodes may be more than 1000, more than 10,000, more than 100,000, or more than 1,000,000. Nodes 202_a_-202_h_ may be any combination of host systems, processor nodes, storage subsystems, and I/O chassis. InfiniBand fabric 210 may also include one or more router for connection with other networks 208, such as other InfiniBand subnets, LANs, wide area networks (WANs), or the Internet.

Interconnected switches 204_a_-204_d_ and router 206, if present, may be referred to as a switch fabric, a fabric, a network fabric, or simply a network. The terms "fabric" and "network" may be used interchangeably herein.

InfiniBand or RoCE operations are based on the ability to queue instructions to be executed by a communication hardware. There may be a work queue for send operations and a work queue for receive operations. The send queue may include instructions that determine how data is to be transferred between a requestor's memory and a receiver's memory. The receive queue may include instructions regarding where to store data that has been received. If a request is submitted, its instruction is placed in the appropriate work queue, which may be executed in an order, such as first in first out (FIFO).

A host channel adapter may represent a local channel interface. A channel interface may include hardware, firmware, and software that provide InfiniBand services to a host. In the case of a send operation, the channel adapter interprets the type of work, creates a message, segments it (if needed) into multiple packets, adds the routing information, and sends the packets to a port logic. The port logic is responsible for sending the packets across the links through the fabric to its destination. When the packets arrive at the destination, the receiving port logic validates the packets, and the channel adapter puts the received packets at the destination in the receive queue and processes them. If requested, the channel adapter may create an acknowledge (ACK) and sends the ACK back to the source host.

The send work queue (SQ) and the receive work queue (RQ) can be paired to create a unique entity for communication—queue pair (QP). The QP is a memory-based abstraction where communication is achieved through direct memory-to-memory transfers between applications and devices. Applications do not share queue pairs. A QP may be a message transport engine implemented on the host side of an HCA and is bi-directional. It can be used to dedicate adapter resources for the user or application to bypass a kernel for data send and receive operations. The QP's send queue and receive queue are used to buffer and pass messages in work queue elements (WQEs) to the HCA. Each QP has a queue pair number (QPN) assigned by the channel adapter. The QPN uniquely identifies a QP within the channel adapter.

Figure 3:
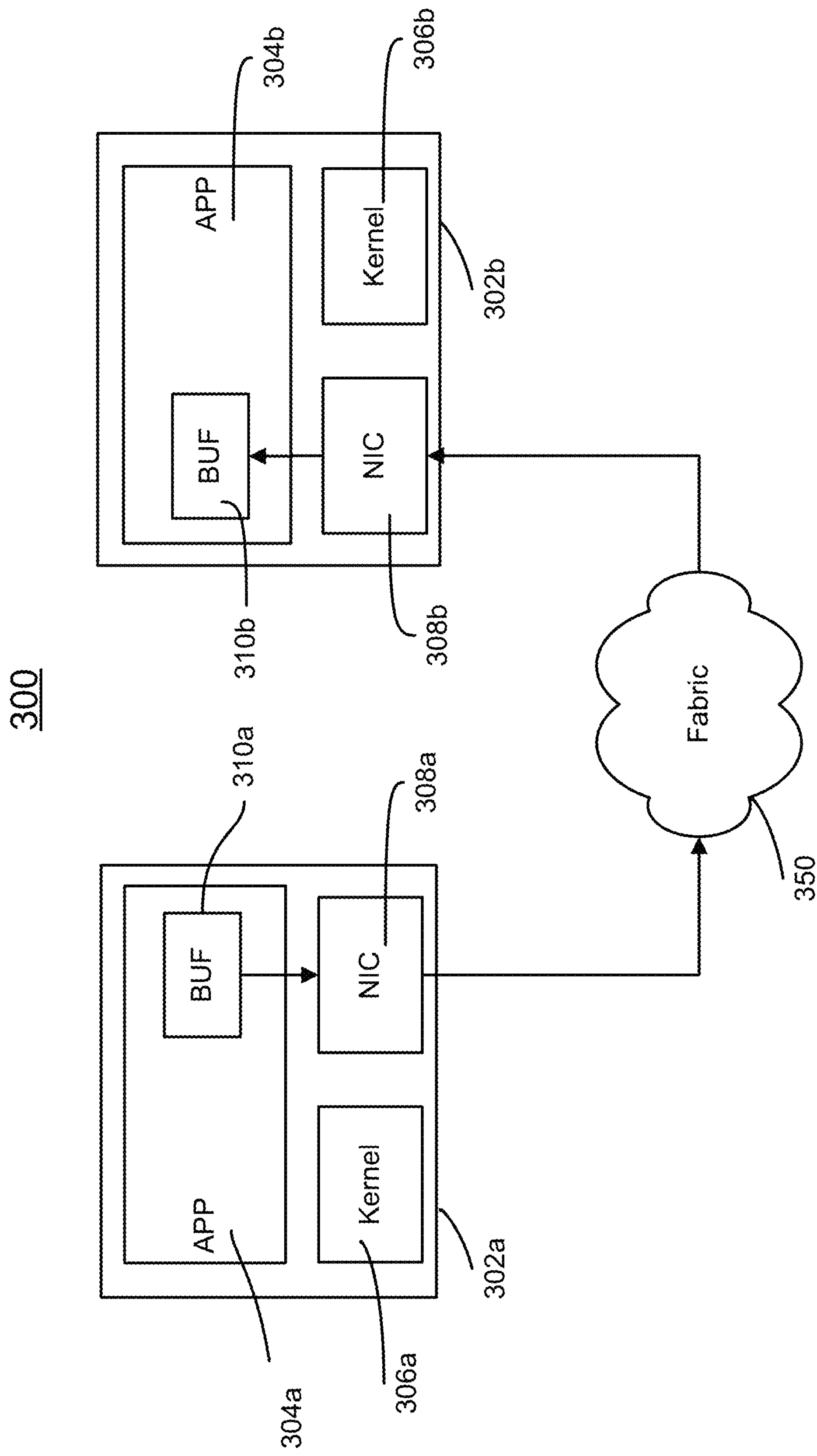
FIG. 3 illustrates an InfiniBand network connection between a source endpoint and a destination endpoint.

FIG. 3 illustrates a block diagram 300 of an InfiniBand network connection between a source endpoint 302_a_ and a destination endpoint 302_b_. Source endpoint 302_a_ may include a plurality of applications 304_a_, a kernel 306_a_, and a network interface card (NIC) or adapter 308_a_. Each application 304_a_ may include a buffer 310_a_ associated with it for storing messages to be sent or received. Similarly, destination endpoint 302_b_ may include a plurality of applications 304_b_, a kernel 306_b_, and a network interface card (NIC) or adapter 308_b_. Each application 304_b_ may include a buffer 310_b_ associated with it for storing messages to be sent or received. A QP can be created between application 304_a_ on source endpoint 302_a_ and application 304_b_ on destination endpoint 302_b_, through an InfiniBand fabric 350.

After a QP is created, a message may be transmitted from source endpoint 302_a_ to destination endpoint 302_b_ using Remote Data Memory Access (RDMA). RDMA allows a server on the InfiniBand fabric to access the memory of another server directly. An example of application of RDMA is a database server cluster. The database server cluster may add a RDMA agent to its core functionality, which allows two database instances running on different nodes to communicate directly with each other, bypassing all of the kernel-level communication operations, thus reducing the number of times that the data is copied from a persistent storage into a RAM memory of the cluster nodes. An RDMA operation may specify a local buffer, an address of a peer buffer, and access rights for manipulation of the remote peer buffer.

Figure 4:
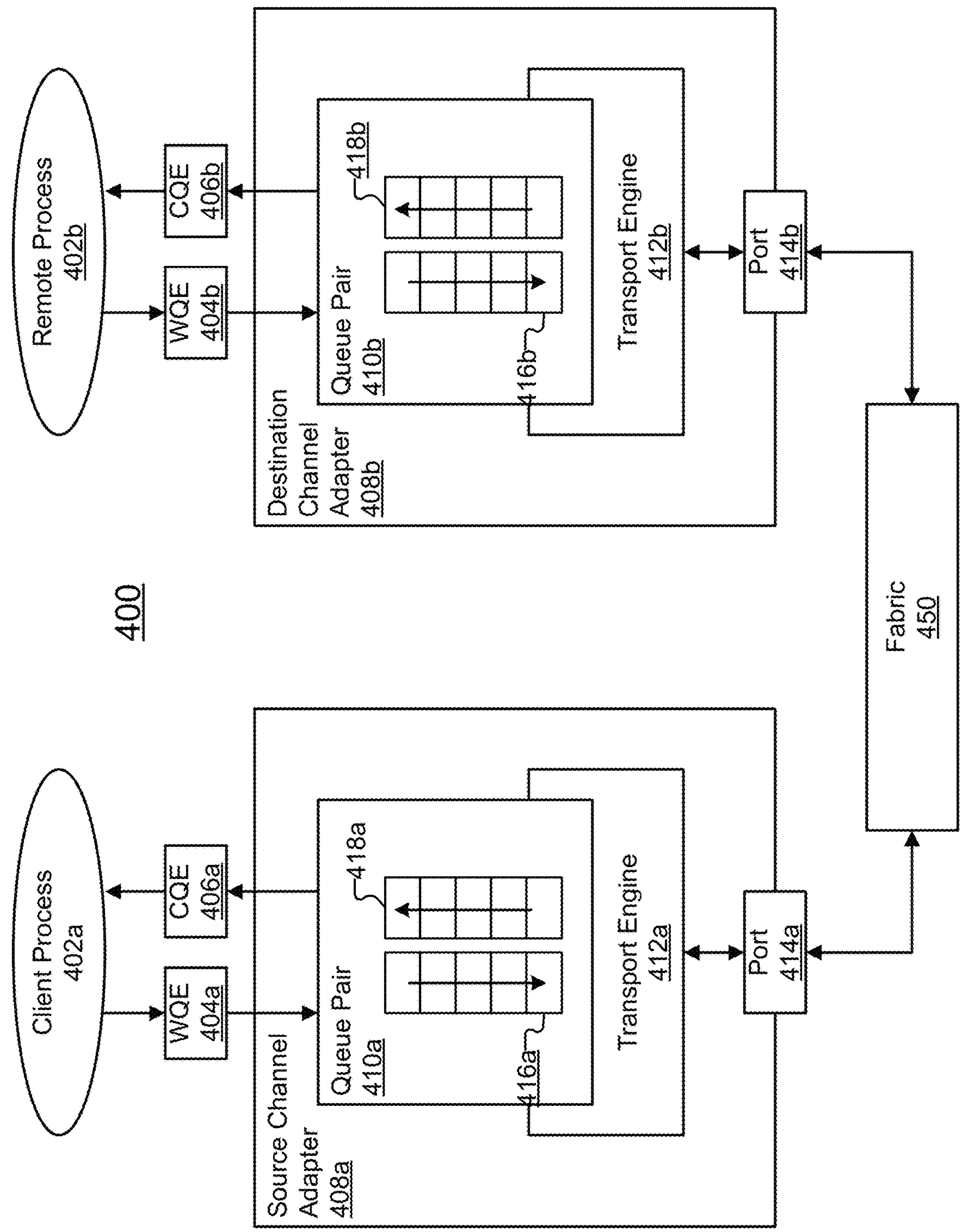
FIG. 4 illustrates queue pairs (QPs) in an InfiniBand connection between a source endpoint and a destination endpoint.

FIG. 4 illustrates a system 400 including queue pairs in an InfiniBand connection between a client application or process 402_a_ on a source endpoint and a remote application or process 402_b_ on a destination endpoint. InfiniBand off-loads traffic control from software clients through the use of execution work queues. The work queues are initiated by the client, and then left for InfiniBand to manage. For each communication channel between devices, a work queue pair (WQP) may be assigned at each end. For example, client process 402_a_ may place a transaction into a work queue entry or element (WQE) 404_a_, which is then processed by source the destination endpoint. Data in send queue 416_a_ may be processed by transport engine 412_a_ and sent to InfiniBand fabric 450 through port 414_a_ of source channel adapter 408_a_. The data may then be received by destination channel adapter 408_b_ through port 414_b_, processed by transport engine 412_b_, and put in receive queue 418_b_. When the destination endpoint responds, destination channel adapter 408_b_ returns status to client process 402_a_ through a completion queue entry or event (CQE) 406_a_. The source endpoint may post multiple WQEs, and source channel adapter 408_a_ may handle each of the communication requests. Source channel adapter 408_a_ may generate the completion queue entry (CQE) 406_a_ to provide status for each WQE in a properly prioritized order. This allows the source endpoint to continue with other activities while the transactions are being processed.

Similarly, remote process 402_b_ may place a transaction into a WQE 404_b_, which is then processed by destination channel adapter 408_b_ from a send queue 416_b_ in QP 410_b_ and sent to client process 402_a_ on the source endpoint. Data in send queue 416_b_ may be processed by transport engine 412_b_ and sent to InfiniBand fabric 450 through port 414_b_ of destination channel adapter 408_b_. The data may then be received by source channel adapter 408_a_ through port 414_a_, processed by transport engine 412_a_, and put in receive queue 418_a_. The source endpoint may respond by returning status to remote process 402_b_ through a CQE 406_b_.

InfiniBand fabric 450 may be a fabric such as fabric 210 as described in FIG. 2. In networks built using the spanning-tree protocol or layer-3 routed core networks, a single "best path" is usually chosen from a set of alternative paths. All data traffic takes that "best path" until a point where the "best path" gets congested and packets are dropped. The alternative paths are not utilized because a topology algorithm may deem them less desirable or removed them to prevent loops from forming. It is desirable to migrate away from using spanning-tree while still maintaining a loop-free topology yet utilizing all the available links.

Over the years, the Clos or "fat-tree" network has been widely used again. A Clos network is a multi-stage switching network. The advantage of such network is that connections between a large number of input and output ports can be made by using only small-sized switches and the network can be easily scaled. A bipartite matching between the ports can be made by configuring the switches in all stages.

Figure 5:
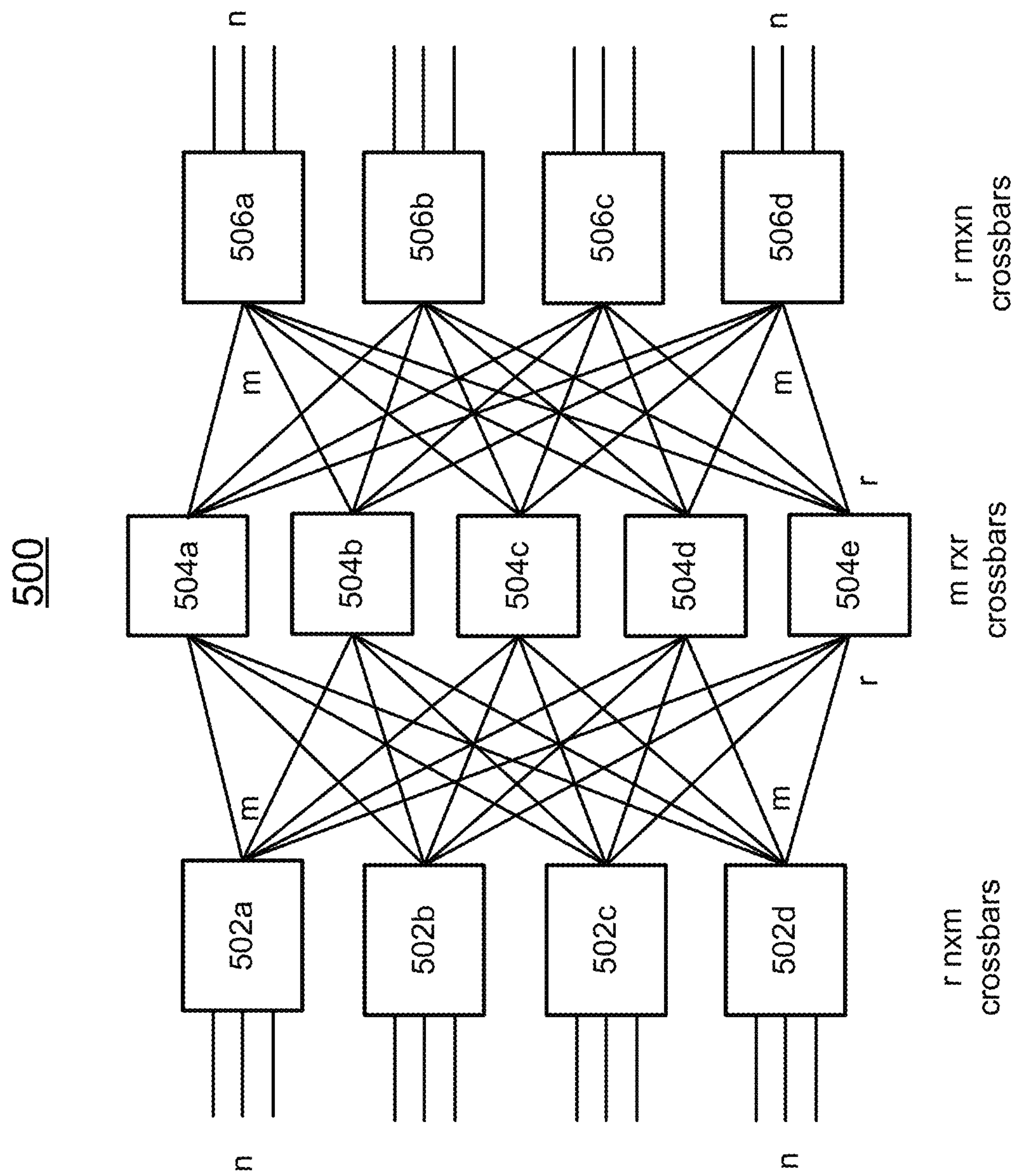
FIG. 5 illustrates a multi-stage Clos network.

FIG. 5 illustrates an example of a 3-stage Clos network 500. Clos network 500 includes r n×m ingress stage crossbar switches 502*a*-502*d*, m r×r middle stage crossbar switches 504*a*-504*e*, and r m×n egress stage crossbar switches 506*a*-506*d*. In FIG. 5, n represents the number of input ports on each of the r ingress stage crossbar switches 502*a*-502*d*, m represents the number of output ports on each of the r ingress stage crossbar switches 502*a*-502*d*. There is one connection between each ingress stage switch and each middle stage switch, and one connection between each middle stage switch and each egress stage switch. With m≥n, a Clos network can be non-blocking like a crossbar switch.

Figure 6:
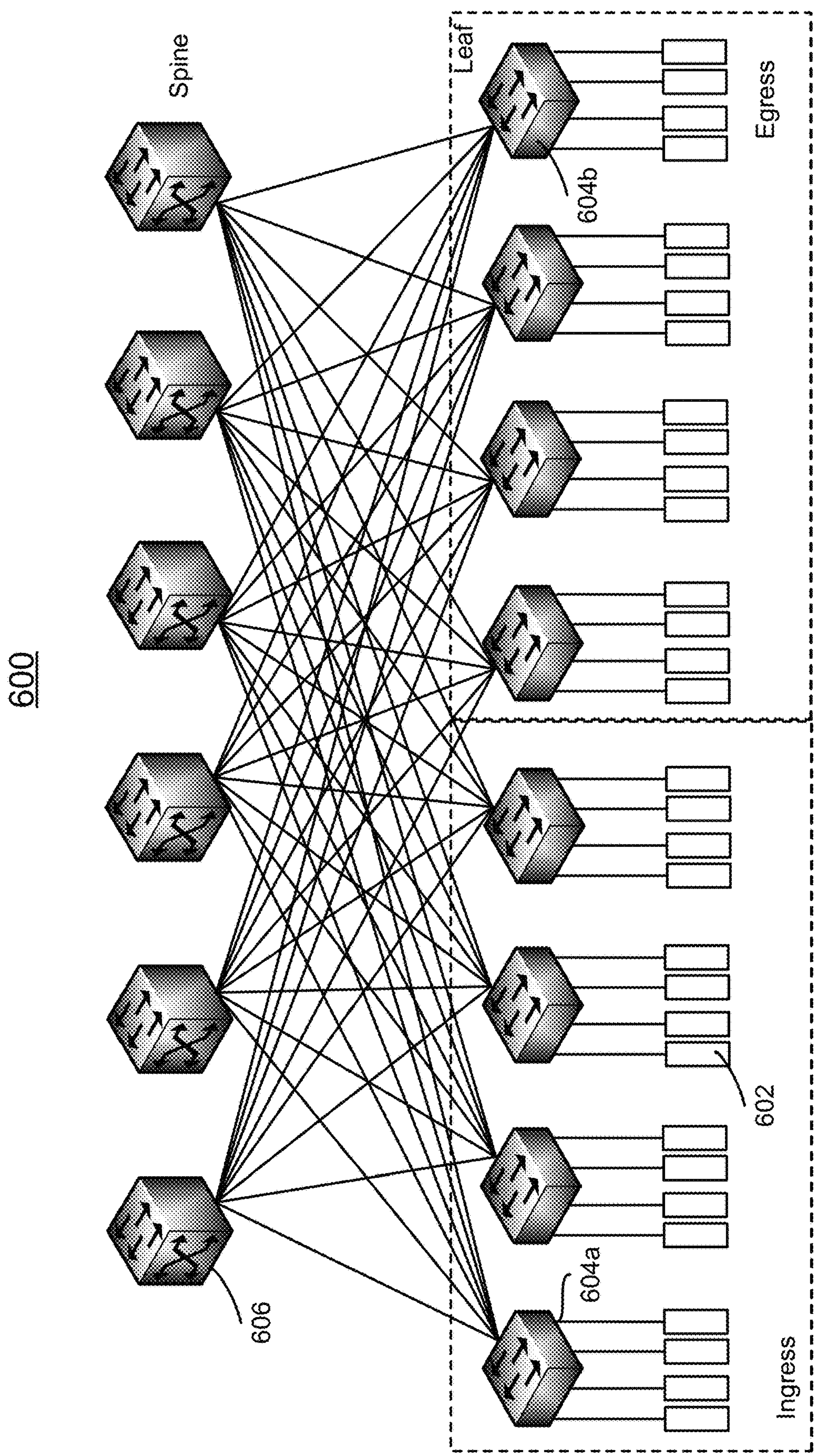
FIG. 6 illustrates a Clos network in a data center environment.

FIG. 6 illustrates an example of a folded Clos network 600 used in a data center. Clos network 600 includes top-of-rack (ToR) switches 604*a* and 604*b* and spine switches 606. ToR switches 604*a* and 604*b* are leaf switches and are connected to spine switches 606. Leaf switches 604*a* may be referred to as ingress switches as crossbar switches 502*a*-502*d* in FIG. 5, and leaf switches 604*b* may be referred to as egress switches as crossbar switches 506*a*-506*d* in FIG. 5. Leaf switches 604*a* and 604*b* may be connected to a plurality of servers 602. Spine switches 606 connect to leaf switches 604*a* and 604*b*. Leaf switches 604*a* and 604*b* are not directly connected to each other, but are connected indirectly through spine switches 606. In this spine-leaf architecture, the number of uplinks from a leaf switch is equal to the number of spine switches, and the number of downlinks from a spine switch is equal to the number of leaf switches. The total number of connections is the number of leaf switches multiplied by the number of spine switches, for example 8×6=48 links in FIG. 6.

In Clos network 600, every lower-tier switch (leaf switch) is connected to each of the top-tier switches (spine switches) in a full-mesh topology. If there is no oversubscription taking place between the lower-tier switches and their uplinks, then a non-blocking architecture can be achieved. A set of identical and inexpensive switches can be used to create the tree and gain high performance and resilience that would otherwise cost must more to construct.

Figure 7:
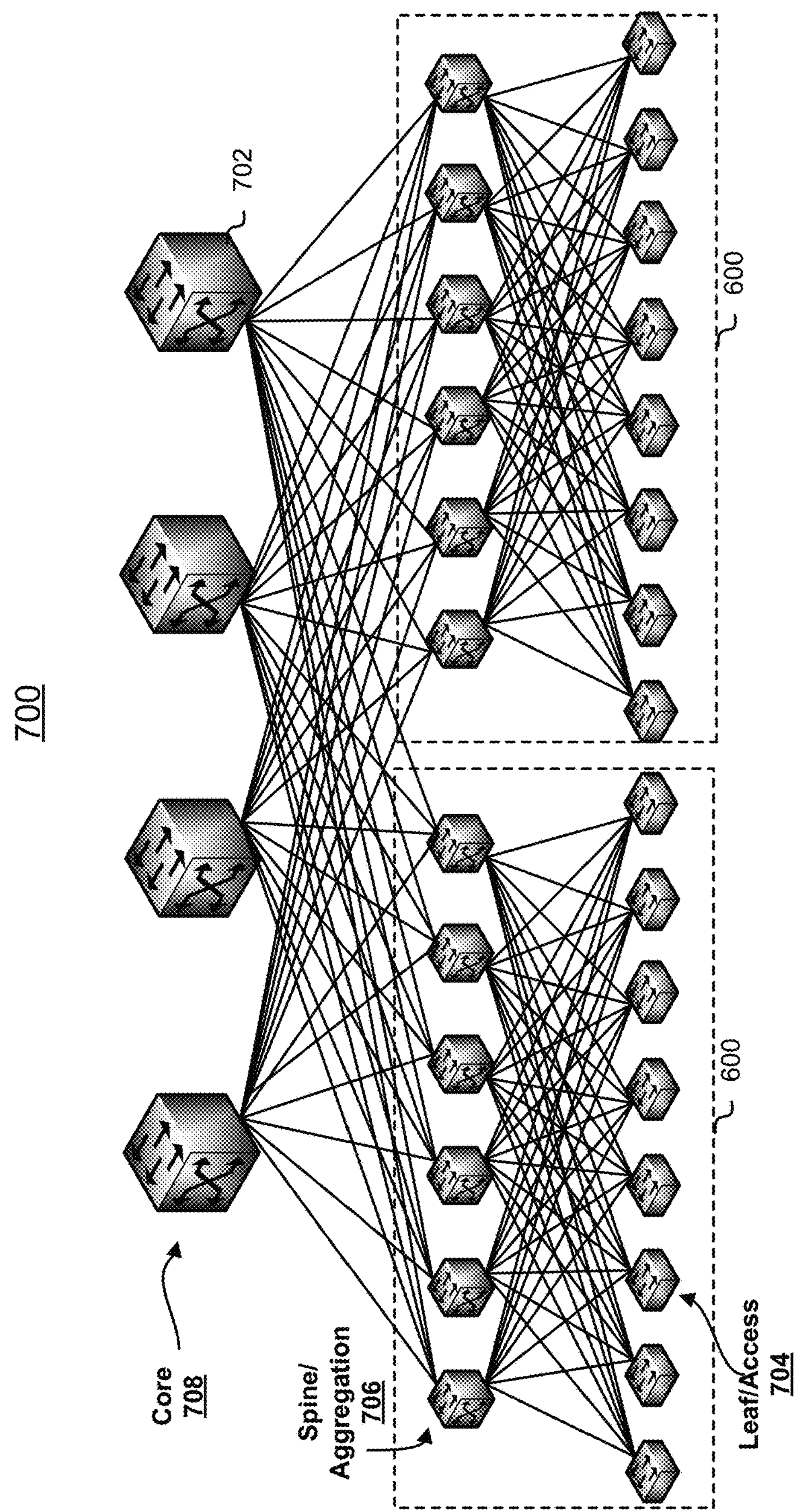
FIG. 7 illustrates a topology of a network fabric.

Clos network 600 may be easily scaled to build a larger network. For example, FIG. 7 illustrates a multi-stage Clos network 700 in a data center environment by connecting two or more Clos networks 600 using an additional layer of core switches or routers 702. Clos network 700 may include a leaf or access layer 704, a spine or aggregation layer 706, and a core layer 708.

The paths in a Clos network as shown in FIG. 6 or FIG. 7 can be chosen by selecting ports of the switches or routers using a routing technique such that the traffic load can be evenly distributed between the spine or the core switches. If one of the spine or core switches fails, it may only slightly degrade the overall performance of the data center.

II. Multipath Routing

Routing is the process of selecting the best path for a data transfer from a source node to a destination node in a network. An example of routing technique is an equal cost multipath (ECMP) routing. ECMP is a forwarding mechanism for routing packets along multiple paths of equal cost with the goal of achieving substantially equally distributed link load sharing or load balancing. ECMP enables the usage of multiple equal cost paths from the source node to the destination node in the network. The advantage is that data traffic can be distributed more evenly to the whole network to avoid congestion and increase bandwidth. ECMP is also a protection method because, during link failure, traffic flow can be transferred quickly to another equal cost path without severe loss of traffic. With ECMP, equal cost paths can be stored in a load balancing table in a forwarding layer of a router. Upon a detection of a link failure, data traffic can be distributed between the rest of the equal paths within a sub-second and without severe loss of traffic.

ECMP does not use any special configuration. A shortest path first (SPF) technique, such as open shortest path first (OSPF) technique, can be used to compute equal cost paths, and these paths can then be advertised to forwarding layers. The router may first select a key by performing a hash, such as a 16-bit cyclic redundancy check (CRC-16), over the packet header fields that identify a data flow. The next-hops in the network may be assigned unique regions in the key space. The router may use the key to determine which region and thus which next-hop (and which port connected to the next-hop on a switch or router) to use.

ECMP does not take into account any differences in the bandwidth of the outgoing interfaces. Furthermore, for current ECMP routing in a data center environment, the hash function may lead to most or all data center nodes getting the same hash value for the same flow. Thus, a same path may be used for routing packets in a flow in the data center environment, and other alternate paths may be underutilized.

Multipath routing is a mechanism for improving network performance and providing fault tolerance. There are several multipath techniques for load balancing in a network, such as MultiPath TCP (MPTCP) and Multipathing in InfiniBand.

In TCP/IP, packets are generally delivered in order. Thus, it is difficult to break a message into multiple packets and send the packets using TCP/IP on different paths while ensuring in-order delivery because delays on different paths may be different. MPTCP uses several IP-addresses/interfaces simultaneously by a modification of TCP that appears to be a regular TCP interface to applications, while in fact spreading data across several subflows. Benefits of this include better resource utilization, better throughput and smoother reaction to failures. Multipath TCP is particularly useful in the context of wireless networks. A smartphone may have separate, simultaneous interfaces to a cellular network, a Wi-Fi network, and, possibly, other networks via Bluetooth or USB ports. Each of those networks provides a possible way to reach a remote host. In addition to the gains in throughput, links may be added or dropped as the user moves in or out of network coverage, without disrupting the end-to-end TCP connection. However, each subflow in the MPTCP may use a different source or destination IP address.

Multipathing in InfiniBand may be achieved by assigning multiple local identifiers (LIDs) to an end point. Upper-level protocols, such as Message Passing Interface (MPI), can utilize the multiple LIDs by striping (dividing a message into several chunks) and sending out data across multiple paths (referred to as MPI multirailing). InfiniBand standard defines an entity called subnet manager, which is responsible for the discovery, configuration and maintenance of a network. Each InfiniBand port in a network is identified by one or more LIDs, which are assigned by the subnet manager. Each device within a subnet may have a 16 bit LID assigned to it by the subnet manager. Packets sent within a subnet use the LID for addressing. Each port can be assigned multiple LIDs to exploit multiple paths in the network. InfiniBand also provides a mechanism called LID Mask Control (LMC). LMC provides a way to associate multiple logical LIDs with a single physical port by masking the LID's least significant byte. When packets are received at a switch, the 8 least significant bits of the destination LID may be masked by the LMC and ignored. Thus, assigning several LIDs with different least significant byte to a same port allows several paths to be established between the same pair of nodes.

As described above, routing algorithms may calculate a hash over selected fields in a packet header. Typically, source and destination addresses in the IP header are used for the routing. The protocol field and type of service field of the IP header, the source address and destination layer of the multiple access control (MAC) layer, or source and destination ports may also be used.

A port is a software structure that is identified by a port number. A port is typically associated with an IP address of a host and the protocol type of the communication, and forms a part of the destination or source address of a communications session. A port is typically identified for each address and protocol by a 16-bit port number. Applications on hosts may use datagram sockets to establish host-to-host communications. An application may bind a socket to its endpoint of data transmission, which may be a combination of an IP address and a service port.

Some of the fields used for hash calculation, such as the source and destination addresses and destination port, may be fixed and cannot be changed for the delivery of a packet. Some other fields, however, are optional and may be modified, which may affect the path a packet is routed but may not affect the safe delivery of the packet. Thus, such fields may be modified differently for different packets such that packets with same source IP address, destination IP address and destination port may be delivered on different paths.

Figure 8:
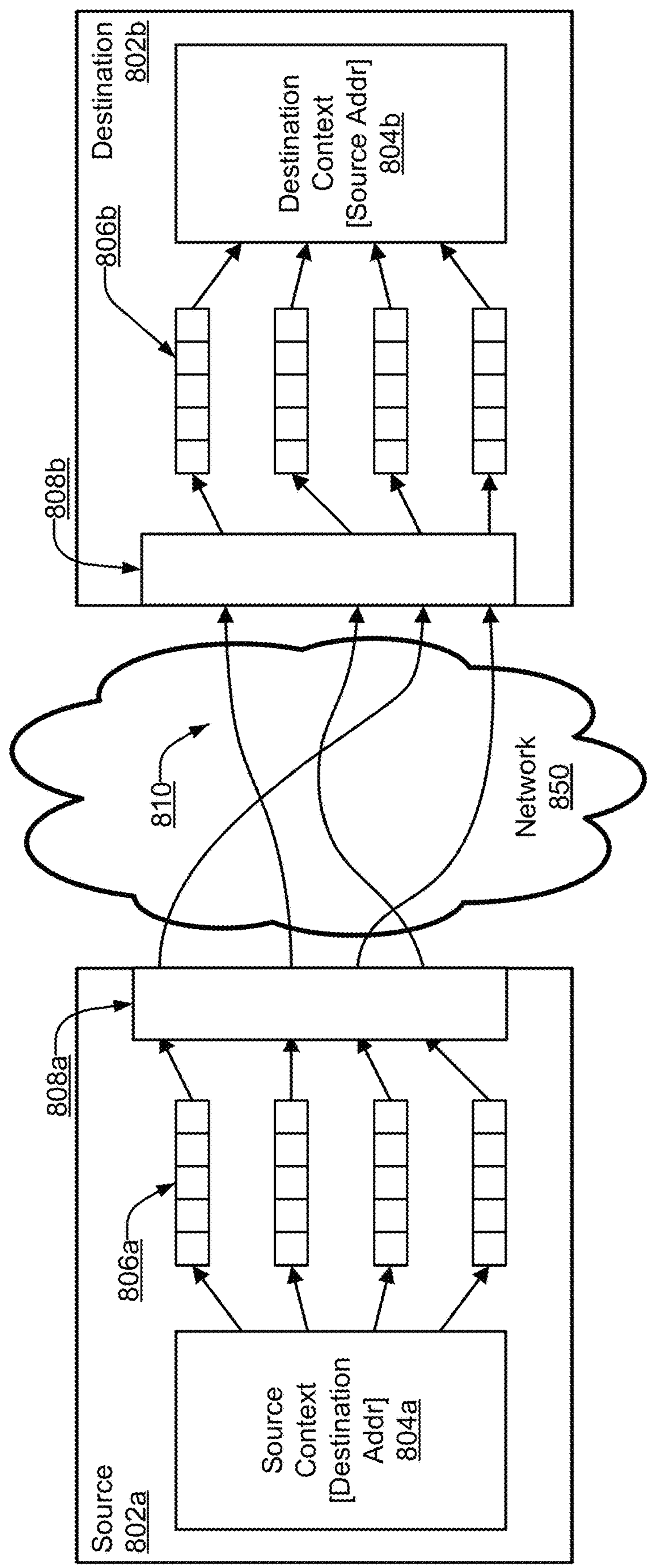
FIG. 8 illustrates multiple flowlets for a data communication between a source endpoint and a destination endpoint.

FIG. 8 illustrates multiple paths 810 for a data communication between a source endpoint 802*a* and a destination endpoint 802*b*. As shown in FIG. 8, source context data 804*a* to a destination address (e.g., a destination context 804*b*) may be split into a plurality of flowlets 806*a*, wherein packets in each flowlet may have a same packet header and thus may be routed through a same path. Packets in different flowlets may have a same source IP address, destination IP address and destination port, but may have different values in certain field of the packet header, wherein the values in the certain field of the packet header are used for routing. Thus, packets in different flowlets 806*a* may go from a same physical port 808*a* on a same source IP address to a same physical port 808*b* and different flowlets 806*b* on a same destination IP address by taking different paths 810 through network 850. An example of multiple-flowlet communication between a source node and a destination node using UDP as the transport layer protocol is described below.

UDP is a minimal message-oriented transport layer protocol. UDP uses a connectionless transmission model with a minimum of protocol mechanism. It has no handshaking dialogues, and thus exposes any unreliability of the underlying network protocol to the user's program. UDP provides no guarantees to the upper layer protocol for message delivery, and the UDP layer retains no state of UDP messages once sent. There is no guarantee of delivery, ordering, or duplicate protection.

With UDP, computer applications can send messages, referred to as datagrams, to other hosts on an Internet Protocol (IP) network without prior communications to set up special transmission channels or data paths. UDP uses port numbers for different functions at the source and destination of a datagram. UDP is suitable for applications where error checking and correction is either not necessary or can be performed in the application, thus avoiding the overhead of such processing at the network interface level. Time-sensitive applications often use UDP because dropping packets is preferable to waiting for delayed packets, which may not be an option in a real-time system.

Figure 9:
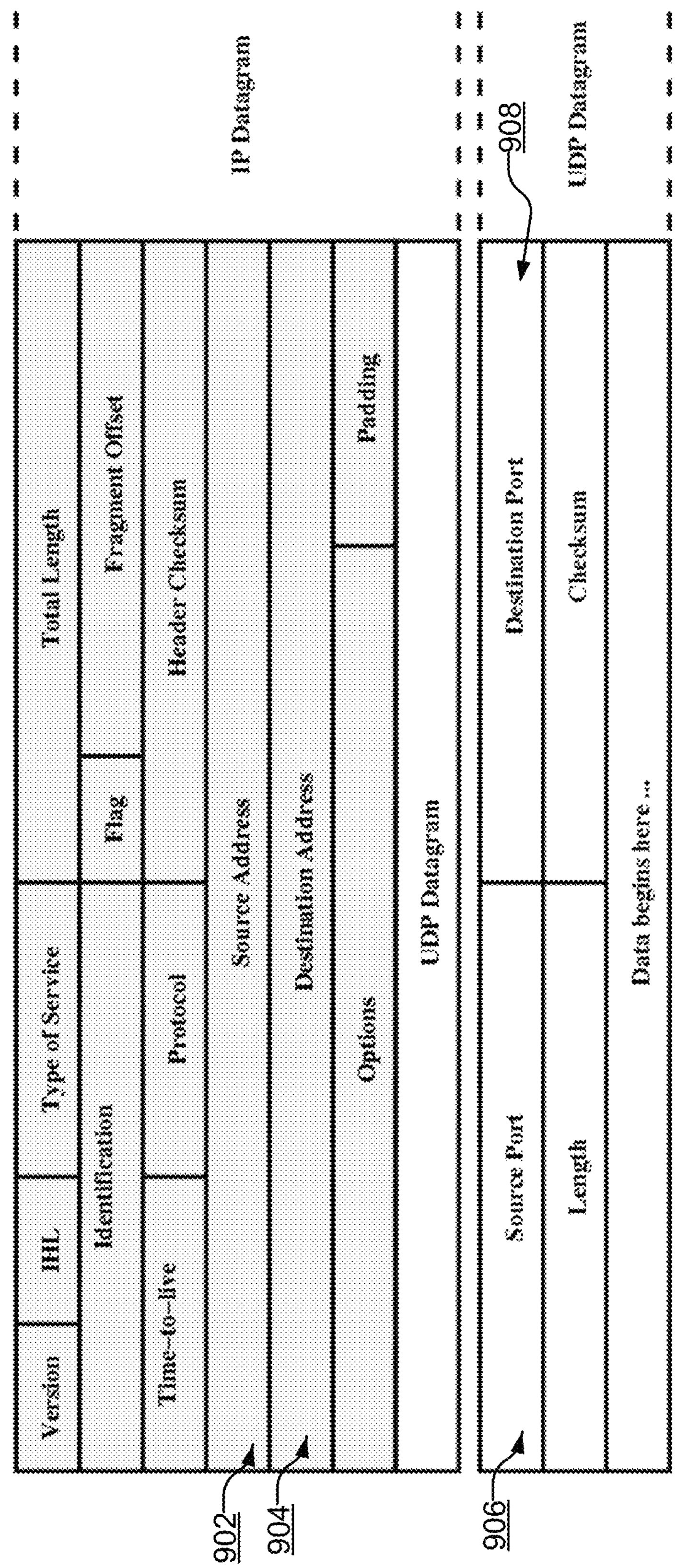
FIG. 9 illustrates a UDP/IP packet header.

FIG. 9 illustrates a UDP/IP packet header 900. Source address 902 and destination address 904 are included in the IP header. The UDP header includes 4 fields, each of which is 2 bytes (16 bits). Destination port field 908 identifies the receiver's port and is required. Destination port field 908 generally indicates which protocol is encapsulated in a UDP frame.

Source port field 906 identifies the sender's port when meaningful, and is assumed to be the port to reply to if needed. If not used, source port field 906 may be set to zero. If the source host is a client, the source port number is likely to be an ephemeral port number. If the source host is a server, the source port number is likely to be a well-known or well-defined port number.

The use of the Checksum field and source port field 906 is optional in Internet Protocol version 4 (IPv4). In Internet Protocol version 6 (IPv6), only source port field 906 is optional.

As described above, UDP does not guarantee in-order delivery. Therefore, even if routing different packets in a communication through different paths may cause out-of-order delivery, such out-of-order delivery is expected in UDP protocol anyway. Furthermore, using ECMP may also increase reordering compared to UDP without using ECMP. Therefore, embodiments of this disclosure are better suited for applications that do not need ordering, such as ones using UDP protocol. In some embodiments, source port field 906 in UDP header can be modified to route different packets in a communication to different paths because UDP port is only used for detecting the protocol and is not used for delivery of the packets to end user applications, which is generally determined by the endpoint IP addresses. Packets received at a destination node may be reordered or assembled by an application on the destination node based on information in the packets, using, for example, a relaxed reliable datagram (RRD) transport service as described below.

In some embodiments, multi-path data transportation of a flow using multiple flowlets may be achieved through tunneling, by using different source IP addresses (if the source endpoint has multiple IP addresses) or different destination IP addresses (if the destination endpoint has multiple IP addresses), by using the FlowID field in IPv6 header, or by using multiprotocol label switching (MPLS) label.

III. Example

Basic transport service provided by a remote direct memory access (RDMA) card is Unreliable Datagram (UD). It is relatively uncommon to use UD for HPC datapath. UD usually relies on lossless fabric that will not drop a packet unless it is corrupted. Another common transport service type is Reliable Connection (RC). RC provides reliable in-order delivery, but it is not scalable. In particular, RC requires a separate connection for each pair of communication threads.

An "ideal" solution for large-scale systems is Reliable Datagram (RD), which uses a single request queue for each thread and a single connection between a pair of communicating nodes. Existing InfiniBand RD standard is not usable due to many problems in the specification. Another existing RD-like partial solution is eXtended Reliability Connection (XRC), which is too complex, and does not provide optimal latency in case of packet drops because it may delay the delivery of packets unrelated to the dropped packets.

In-order delivery may limit the scalability or increase average latency in case of packet drops. Keeping sequence numbers on an endpoint-to-endpoint flow level is not scalable because of the space used and the connection management overhead. Sequence numbers on a multiplexed node-to-node connection level may provide enough information to detect lost or duplicated packets, but may not provide enough information to determine if an arriving packet that is out-of-order on the aggregated connection is actually out-of-order on an endpoint-to-endpoint flow. If the delivery of the arriving packet that is out-of-order on the aggregated connection to the host is postponed, large intermediate buffer space may be desired, and average latency may be greatly increased, because many packets may be delayed until a missing packet is re-sent or an out-of-order packet arrives. Most or all of these delayed packets may be unrelated to the lost packet or the out-of-order packet, and thus such delay may be unnecessary. Dropping out-of-order packets may solve the buffering problem, but may not solve the latency problem, and may increase network bandwidth consumption.

Relaxed Reliable Datagram is a type of transport service with simple UD-like interface but with transparent recovery from packet loss. RRD does not guarantee packet ordering, because guaranteeing packet ordering may include either keeping state for all QP-to-QP flows, which is not easily scalable, or serialization of packets belonging to different logical flows into a single sequence of packets, which may create false dependency between unrelated flows and thus increase average and max latency. Even though RRD does not guarantee packet ordering, it is possible that packets that appear to be out-of-order at RRD level are actually in order on their QP-to-QP flows because a single RRD connection may include multiple multiplexed flows. Since a host software may keep track of its message flows, the ordering may be done by the host. Therefore, RRD only guarantees that each packet will be eventually delivered to an appropriate queue. Packets can be delivered to the destination endpoint queue even when they are out-of-order, and sequence numbers may be tracked at the node-to-node connection level. The per-flow (endpoint-to-endpoint) numbering can be done by the host driver, and the sequence number can be transferred with the packet to the driver on the destination host, but is not examined on the transport layer. RRD can also be configured to drop out-of-order packets, and thus provide in-order delivery.

RRD transport may send packets over all available paths for load balancing, while maintaining up-to-date information about congested or faulty paths. If a single connection context is used for a particular destination, RRD transport may not easily distinguish out-of-order acknowledge (ACK) packets caused by multipath delivery from out-of-order ACKs caused by dropped packets. Therefore, RRD state is arranged on a per-path basis, where packets sent to a particular destination on a particular path have a separate context and independent packet numbering. In other words, a RRD context for a specific destination may include multiple unidirectional flowlet contexts, where each flowlet may use a different path as described above. For example, each flowlet context may include a source UDP port field used in the outer header. Each flowlet may be associated with a different path that can be re-assigned in case of timeout or excessive packet loss. Packet sequence numbers can be tracked independently on each flowlet.

Figure 10:
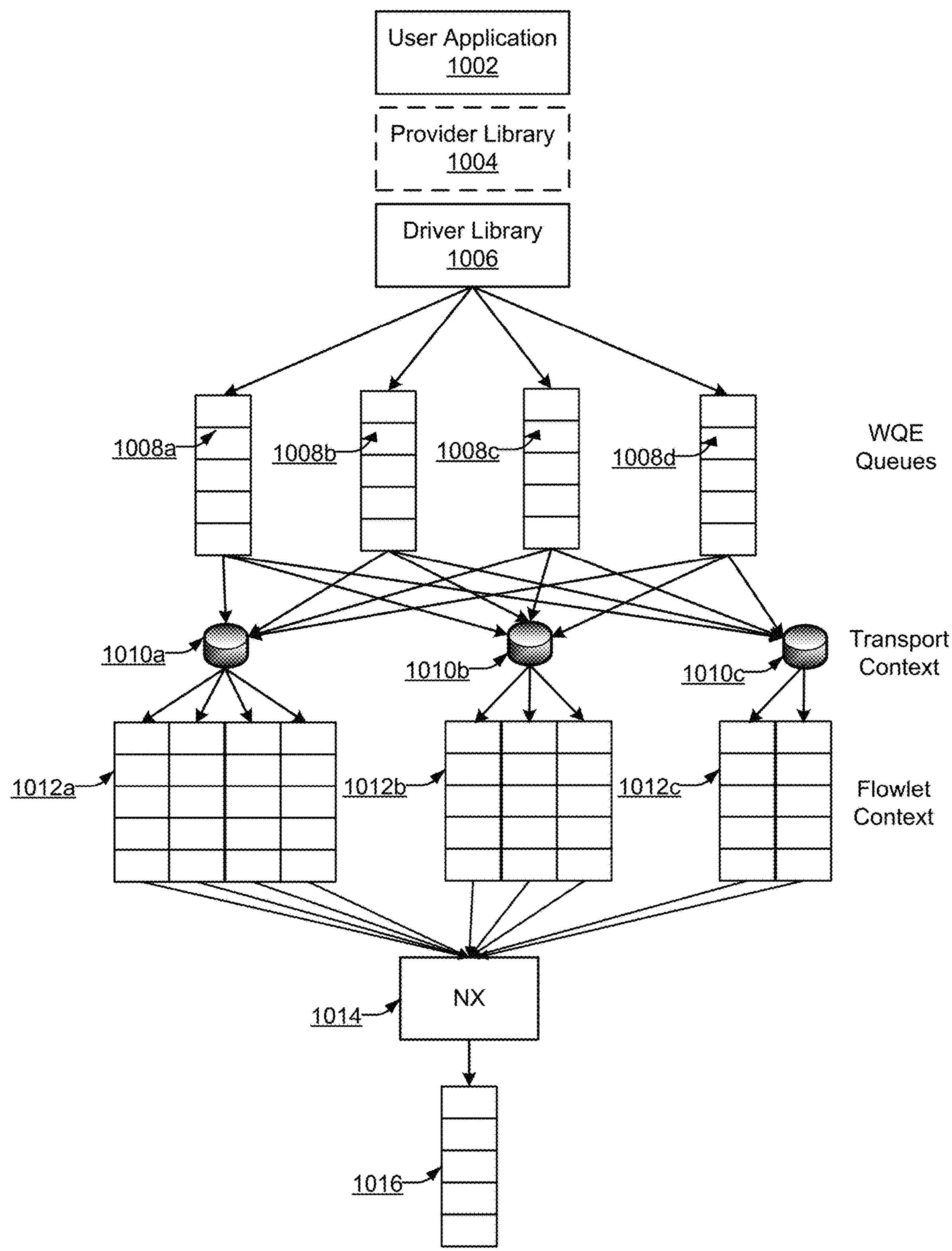
FIG. 10 illustrates a block diagram of a source endpoint communicating with multiple destination endpoints through one physical port to a network.

FIG. 10 illustrates an example block diagram of a source endpoint communicating with multiple destination endpoints through one physical port using, for example, RRD transport service and UDP/IP protocol. User application 1002 may use provider library 1004 and user space driver library 1006 to send or receive message asynchronously through send or receive queues. FIG. 10 only illustrates the message sending flow. Provide library 1004 may include an OpenFabric interface (OFI) Libfabric provider library or an OpenFabrics Enterprise Distribution (OFED) library.

User application 1002 may send/receive messages through communication endpoints. An application can use multiple communication endpoints. In case of datagram transport, each communication endpoint can be mapped to a single QP. QP number can be assigned by the adapter firmware, and can be maintained separately for each virtual Ethernet interface. QP number can be used as a part of communication endpoint address, in addition to IP address of the virtual Ethernet interface.

User application 1002 may place transactions or messages into multiple WQEs 1008*a*-1008*d*, which can then be processed by a channel adapter and sent to a destination endpoint. WQEs 1008*a*-1008*d* may be arranged based on local endpoint such that one WQE may be used for one local endpoint.

User application 1002 does not generate the UDP/IP packet headers, Rather, it passes the destination network address map index (address handle) in a send message descriptor. This provides lower latency and better security, without compromising one or another. From a performance perspective, the address handle allows the channel adapter to pre-generate the headers, including the outer headers, transmit them without any checks (instead of validating packet headers generated by the application), and minimize the overall latency by avoiding fetching the header and looking it up in a routing table.

Transactions or messages in WQE 1008*a*-1008*d* may be processed to locate transport contexts 1010*a*-1010*c*, such as RRD transport contexts, wherein messages or transactions in each context of transport contexts 1010*a*-1010*c* are to be sent to a same destination IP address.

Messages or transactions in each of transport contexts 1010*a*-1010*c*, such as RRD transport contexts, may be further processed by the channel adapter to select flowlet contexts. For example, messages in transport context 1010*a* may be placed into a plurality of flowlet contexts 1012*a*, messages in transport context 1010*b* may be placed into a plurality of flowlet contexts 1012*b*, and messages in transport context 1010*c* may be placed into a plurality of flowlet contexts 1012*c*. Each of WQEs and transport contexts may be implemented as a software queue or a hardware queue, for example, a buffer such as a first-in first-out (FIFO) buffer. The flowlet contexts may maintain an active packet list and may be stored in, for example, a memory. Flowlet contexts 1012*a*-1012*c* can then be processed by NX 1014 and put into a hardware queue 1016 at an interface between the channel adapter and a network switch to be sent to the network. Hardware queue 1016 may be a FIFO. Each packet in hardware queue 1016 may include application message payload, provider's auxiliary information, and destination address.

As used herein, a flowlet is a group of packets associated with a flow or a data flow transferred on a unidirectional (half-duplex) connection between two network interfaces. A flowlet is unrelated to QPs, and is invisible to user applications. The packets in a flowlet may carry a flowlet index and a packet sequence number. The packet sequence numbers are relative to the flowlet. The source endpoint maintains information on the outstanding unacknowledged packets (sequence numbers and the list of unacknowledged WQEs), including information necessary for retransmit. The destination endpoint may recover the flowlet index or the packet sequence number from a received packet in, for example, the header of the packet, and send an acknowledgement of receiving the packet to the source endpoint. The source endpoint may then remove the sequence number of the packet after the acknowledgement of receiving the packet is received from the destination endpoint. The source endpoints may also remove the sequence number of a packet after the packet has been sent.

Each flowlet may be controlled to have a limited number of outstanding transmit packets. Therefore, slower paths will be used less frequently than faster paths when choosing a flowlet. A flowlet can be either in active state (i.e., having outstanding unacknowledged packets) or idle state (everything is acknowledged).

In general, packets are transmitted on the same path for a given active flowlet. In some embodiments, a transmitter may change the path randomly when packets are assigned to an idle flowlet. The transmitter can also reassign a flowlet to a different path after a timeout, or when experiencing excessive latency or excessive packet drops.

A destination context may keep the sequence number of the last in-order packet and sequence numbers of out-of-order packets, but it may not keep any endpoint buffer information. All arriving non-duplicate packets may be delivered to the next level of RRD service, which may deliver the packets to appropriate QPs. The destination context may generate regular ACK to acknowledge in-order packets, and selective ACK (SACK) packets to report any holes in the received packets sequence.

Flowlets within a particular RRD context may be numbered using short indices. Flowlet index may be specified in the packet header. A same index may be used in both directions for send flowlet context on one side and for the corresponding receive flowlet context on the other side. The maximum number of flowlets per RRD context may be predetermined and hardcoded, or it may be negotiated and adjusted before or during the communication.

The source endpoint may only initialize a new flowlet when a particular address is mapped for the first time. In other words, flowlet connection establishment may be an once-in-a-lifetime operation, unless the sender or the receiver is reset. In some embodiments, when a receiver accepts a “start of sequence” packet, the receiver may accept the “start of sequence” packet and discard any previous flowlet state, unless it determines that the “start of sequence” packet is stale.

Packets transmitted on a particular flowlet generally arrive in-order, but a stale “start-of-sequence” packet may arrive out-of-order, for example, in case where the path of a flowlet is switched shortly after the flowlet is initialized, for example, due to slowness in the path. In such case, a receiver may store the initial sequence number in the received “start-of-sequence” packet, reject any additional “start of sequence” packet on the same flowlet if the packet carries the same sequence number, and, optionally, generate an explicit negative acknowledge (NAK).

A newly started sender, which may not have any knowledge of flowlets history, may not send additional packets after the “start of sequence” packet, until it gets an ACK from the receiver. In the unusual event of a NAK, for example, if the sender accidentally generates the same initial sequence number as the initial sequence number in a previous “start-of-sequence” packet for the flowlet, it may generates a different initial number and retries.

IV. Flowlet Assignment

Two objectives are usually taken into consideration when assigning packets to flowlets. It is desirable that all paths are exercised constantly. It is also desirable that a flowlet gets enough packets to ensure that any lost packet will be detected and reported promptly. If the last packet in a flowlet is dropped, one way to detect the drop is a timeout. Alternatively, in a lightly loaded system, an additional dummy packet may be send after the last packet in the flowlet. Since SACK-based detection allows faster recovery, it is preferable that RRD keeps transmitting packets on all of active flowlets. This can usually be done for heavy traffic, where the number of pending packets is large and flowlets are less likely to dry out. In some situations, there may be many lightly loaded flowlets in a system even though the system as a whole may be heavily loaded. For a lightly loaded system with a small number of pending packets, spreading the packets equally over all available flowlets can lead to a situation where the number of outstanding packets on many or all flowlets may be as small as 0 or 1, which makes SACK useless. One solution is to dynamically adjust the number of flowlets in use, and reassign a flowlet to a different path whenever a flowlet becomes idle or very slow. The total number of flowlets in use may be limited to, for example, 32 or less, and may be adjusted based on, for example, network latency, network bandwidth, or network congestions. In some embodiments, it is preferable to place packets on half-full flowlets rather than on empty ones. In addition, to ensure that a slow-but-steady flow, which may keep a single flowlet non-idle all the time, does not monopolize a path, an additional idle flowlet can be allocated occasionally to ensure that the path is changed eventually.

There may be many different ways to assign packets from a user application to a plurality of flowlets. For example, a packet may be assigned to a flowlet based on the numbers of outstanding packets in all the available flowlets or all the flowlets in use. A packet may be assigned to a flowlet based on information of the application. A packet may also be assigned to a flowlet based on an instruction, request or indication from the application.

In some embodiments where the user application does not specify a flow label, a network adapter device at the transport layer implementing transport service, such as RRD, may assign packets from the user application to a number of flowlets based in the utilization of each flowlet, for example, the number of outstanding packets in each flowlet. The network adapter device may keep record of the total number of outstanding packets, and the last used flowlet. It may also maintain separate lists of flowlets by utilization, where each flowlet of an RRD context may be in one of the following three lists: full, almost empty (less than half-full), and almost full (more than half-full). An empty flowlet may be returned to a shared pool for use by other applications.

The network adapter device at the transport layer may select the same flowlet which was used previously, if it is not full. Otherwise, it may choose another flowlet in the lists of flowlets by utilization, according to the following priority order: almost full, almost empty, and empty (from the shared pool).

In some embodiments, the total number of allowed outstanding packets in a flowlet may be limited to an adjustable number, which may be adjusted based on, for example, network congestions. For instance, if the overall network is congested, the total number of allowed outstanding packets in a flowlet may be increased. If the overall network is less congested, the total number of allowed outstanding packets in a flowlet may be decreased.

Data packets may also be assigned to flowlets based on an observed latency of each flowlet of the available flowlets or the flowlets in use. A flowlet with a lower observed latency may generally be selected. Data packets may also be assigned to flowlets based on a drop rate of each flowlet of the available flowlets or the flowlets in use. A flowlet with a lower drop rate may generally be selected.

The transport layer may also assign packets to different flowlets based on an indication from a user application regarding how to assign the packets. For example, the user application may mark a transmit request with a flow label, such as the flow label supported in OpenFabrics Enterprise Distribution (OFED). A flow label may not instruct the transport layer to transmit the packets on a specific path, but may instruct the transport layer to transmit a message to the same destination on a same path as other messages with the same label. The transport layer map keep a map of flow labels, where each entry in the map includes a flowlet index and the number of outstanding packets in the flowlet. If the number of outstanding packets in a desired flowlet is 0, a new flowlet can be assigned for the packet. If the desired flowlet has too many outstanding packets, for example, from other applications or messages, a new flowlet may also be assigned.

The transport layer may also assign packets from a user application to different flowlets based on information of the user application. For example, for Non-Volatile Memory Express (NVMe) over fabric, the transport layer may assign all packets for a same command to a same flowlet. For some applications, such as Message Passing Interface (MPI), the transport layer may assign the packets to minimize out-of-order delivery. The transport layer may obtain information about the user application by receiving information from other sources or heuristically determining the information.

In some embodiments, the selection of flowlets or paths among multiple network adapter devices or multiple user applications may be coordinated or randomized such that packets from different applications or different network adapter devices may not be assigned to a same path to overload the path. In some implementations, the ports of a switch or router or the source UDP ports that have been used by other applications may be used as an input for determining an appropriate port to be used for a flowlet.

When a flowlet is assigned, it is usually associated with a path such that all packets assigned to the flowlet will take the same path. However, if a path associated with a flowlet has an excessive drop rate that is above a threshold value or have a latency longer than a threshold value, the flowlet and its associated packets may be reassigned to a different path that has a lower drop rate or shorter latency.

V. Network Adapter with Multiple Physical Ports

A network adapter device may include multiple physical output or input ports. Thus, the network adapter device may transmit or receive packets through different physical ports on the device. In other words, the network adapter device may act as a switch itself and form a part of a network or the switch fabric of a network.

Figure 11:
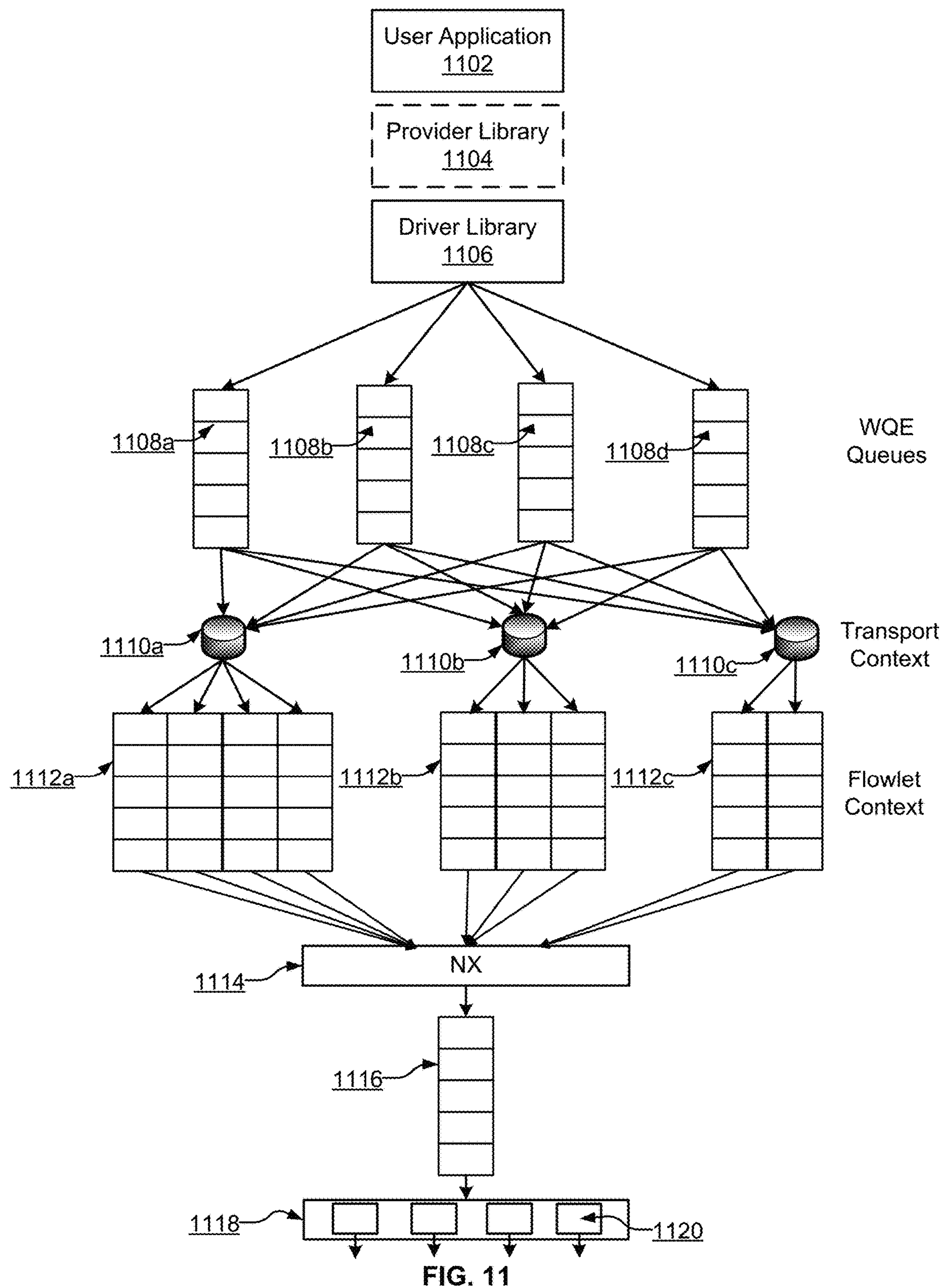
FIG. 11 illustrates a block diagram of a source endpoint communicating with multiple destination endpoints through multiple physical ports to a network.

FIG. 11 illustrates a block diagram of a source endpoint communicating with multiple destination endpoints through multiple physical ports using, for example, RRD transport service and UDP/IP protocol. Similar to FIG. 10, in FIG. 11, user application 1102 may use provider library 1104 and user space driver library 1106 to send or receive messages asynchronously through send or receive queues. Provide library 1104 may include an OpenFabric interface (OFI) Libfabric provider library or an OpenFabrics Enterprise Distribution (OFED) library.

User application 1102 may place transactions or messages into multiple WQEs 1108*a*-1108*d*, which can then be processed by a channel adapter and sent to a destination endpoint. WQEs 1108*a*-1108*d* may be arranged based on local endpoint such that one WQE may be used for one local endpoint. Transactions or messages in WQE 1108*a*-1108*d* may be processed to locate transport contexts 1110*a*-1110*c*, such as RRD transport contexts, where messages or transactions in each of transport contexts 1110*a*-1110*c* are to be sent to a same destination IP address.

Messages or transactions in each of transport contexts 1110*a*-1110*c*, such as RRD transport contexts, may be further processed by a channel adapter to select flowlet contexts. For example, messages in transport context 1110*a* may be placed into flowlet contexts 1112*a*, messages in transport context 1110*b* may be placed into flowlet contexts 1112*b*, and messages in transport context 1110*c* may be placed into flowlet contexts 1112*c*. Flowlet contexts 1112*a*-1112*c* can then be processed by NX 1114 and put into a hardware queue 1116.

Packets in hardware queue 1116 may then be routed to different physical output ports 1120 at an interface 1118 between the network adapter device and an external network. By routing packets through different physical output ports, the throughput of the network adapter device may be increased and a congestion at the interface between the network adapter device and the external network may be reduced.

VI. Method

Figure 12:
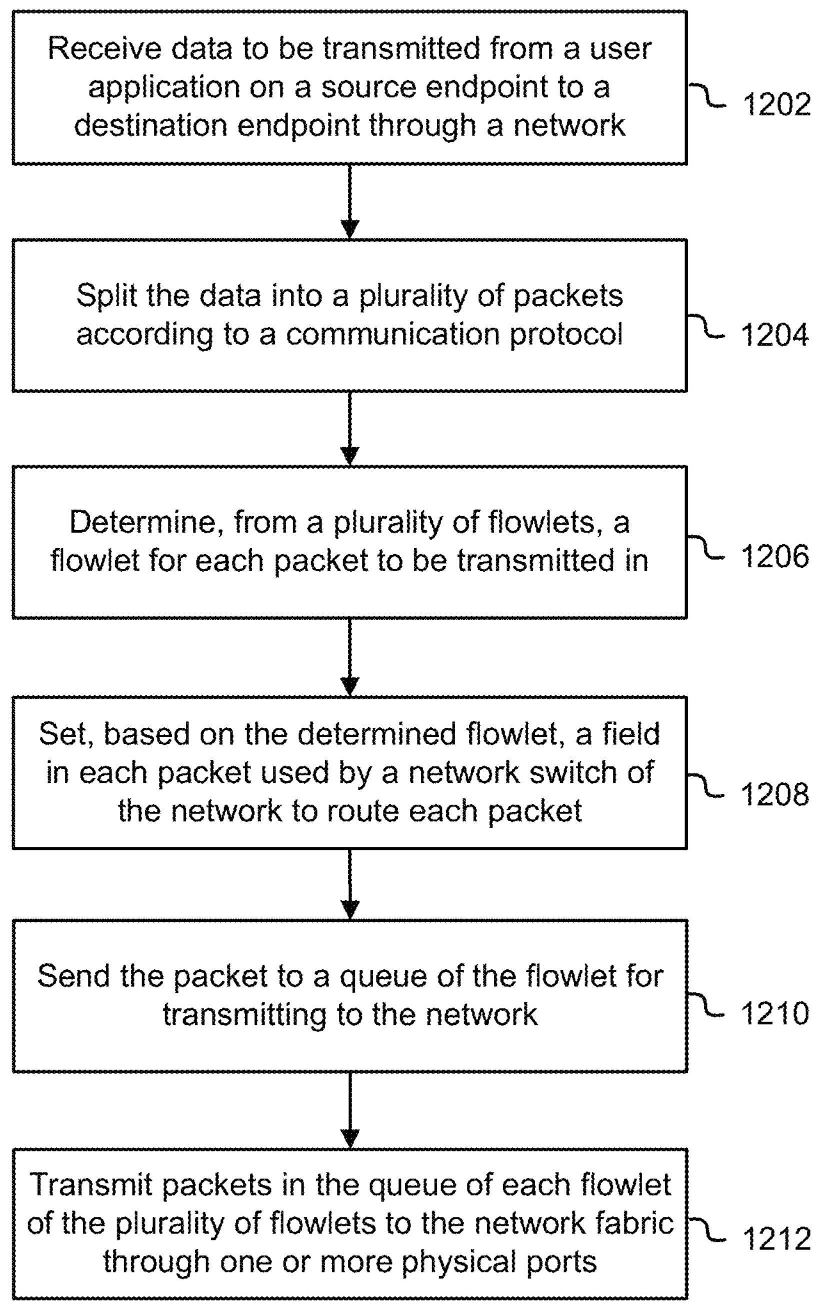
FIG. 12 is a flow chart illustrating a method of data communication between two endpoints by a plurality of flowlets through a network.

FIG. 12 is a flow chart 1200 illustrating a method of data communication between two endpoints by a plurality of flowlets through a network, according to some embodiments of the present disclosure.

At block 1202, a network adapter device may receive data stream to be transmitted from a user application on a source endpoint to a destination endpoint through a network. The data stream may be one or more messages, one or more commands, or one or more transactions. In some embodiments, the source endpoint and the destination endpoint may each have a unique IP address. In some embodiments, multiple endpoints may share an IP address, and user application data streams from multiple source endpoints sharing an IP address to multiple destination endpoints sharing an IP address can thus be multiplexed in an IP-level data stream between a pair of source and destination IP addresses. In other embodiments, a source or destination endpoint may have multiple IP addresses, and it may be desired that each part of the user application data stream be send through a different path in a network using a different combination of source IP address and destination IP address as in, for example, multipath TCP (MPTCP). A user application data stream or a part of a user application stream intended to be transferred from a source IP address to a destination IP address in a single TCP or UDP connection may be referred to herein as a data flow or a flow.

For example, as described above with respect to FIG. 10, user application 1002 may place transactions or messages into multiple WQEs 1008*a*-1008*d*, where WQEs 1008*a*-1008*d* may be arranged based on local endpoint such that one WQE may be used for one local endpoint. User application 1002 may also pass the destination network address map index (address handle) in a send message descriptor. Based on the destination network address map index, transactions or messages in WQE 1008*a*-1008*d* may be processed to locate transport contexts 1010*a*-1010*c*, such as RRD transport contexts, where messages or transactions in each of transport contexts 1010*a*-1010*c* are to be sent to a same destination IP address. Each transport context may be referred to as a flow or a data flow.

In some examples, a user application may provide messages in data packets that include a source IP address and a destination IP address, rather than only providing the messages and the send message descriptor.

At block 1204, the user application data in each flow, such as each transport context in FIG. 10, may be split into a plurality of packets according to a communication protocol, such as TCP/IP or UDP/IP. The plurality of packets may include a header and a payload. The header may be an empty header or include empty field that needs to be updated. The header may include only a part of a TCP/IP or UDP/IP header.

At block 1206, for each packet of the plurality of packets, the network adapter device may determine, from a plurality of flowlets, a flowlet for the packet to be transmitted in. The determination may be made by determining a number of packets in each flowlet of the plurality of flowlets, obtaining information of the user application, or receiving an indication from the user application regarding how the plurality of packets are to be assigned to the plurality of flowlets. In some embodiments, it may be preferable to choose a flowlet that is not lightly loaded or heavily loaded.

At block 1208, for each packet of the plurality of packets, based on the determined flowlet, the value of a field in the packet used by a network switch of the network to route the packet, such as a source UDP port number, may be determined and set. Different source UDP ports may be used for different flowlets. As a result, different flowlets may be sent through different paths in the network by routers or switches that use source UDP port number for routing as described above.

At block 1210, each packet of the plurality of packets may be sent to the assigned flowlet for transmitting to the network. Each packet may include flowlet-specific fields in the header, such as a source UDP port, a flowlet index or identification, and a packet sequence number. The status of each flowlet of the plurality of flowlets, such as the number of outstanding packets, average latency, or estimated packet loss rate on the flowlet, may be monitored and used for assigning flowlets to additional packets.

At block 1212, packets in each flowlet of the plurality of flowlets may be transmitted to the network fabric through one or more physical ports. The packets may be put in a hardware transmit queue at the interface between the network adapter device and the external network.

VII. Device and System

Figure 13:
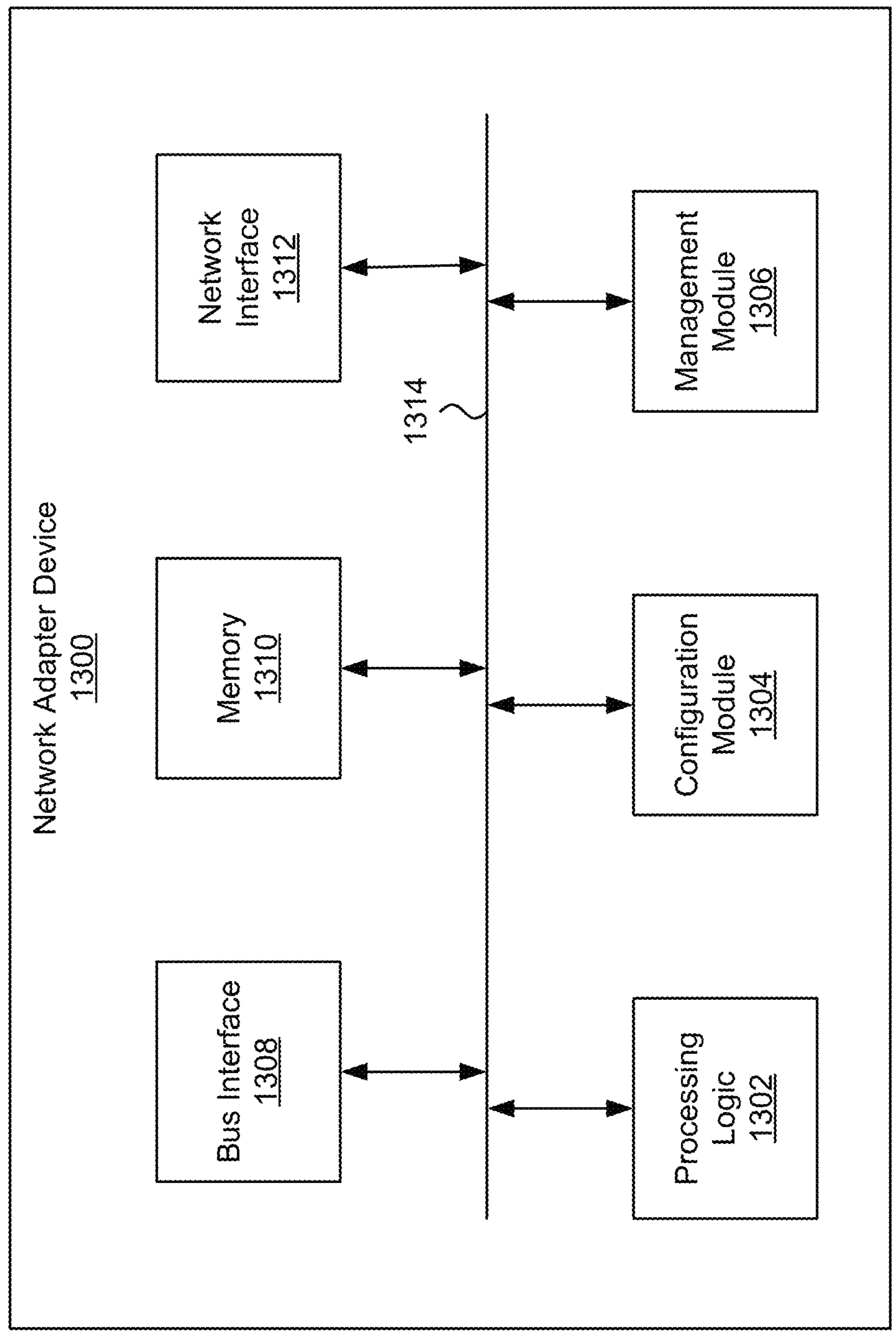
FIG. 13 is a block diagram of a network adapter device.

Embodiment of the present disclosure may be implemented either in hardware such as an adaptor card, or in software that may be run on a host CPU. FIG. 13 illustrates an example of a network adapter device 1300. In this example, the network adapter device 1300 may include processing logic 1302, a configuration module 1304, a management module 1306, a bus interface module 1308, a memory 1310, and a network interface module 1312. These modules may be hardware modules, software modules, or a combination of hardware and software. The network adapter device 1300 may include additional modules, not illustrated here. In some implementations, the network adapter device 1300 may include fewer modules. One or more of the modules may be in communication with each other over a communication channel 1314. The communication channel 1314 may include one or more busses, meshes, matrices, fabrics, a combination of these communication channels, or some other suitable communication channel.

The processing logic 1302 may include one or more processors configured to execute instructions. Examples of processors that may be included in the processing logic 1302 include processors developed by ARM, MIPS, AMD, Intel, Qualcomm, and the like. Processors included in processing logic 1302 may also be implemented in an ASIC or an FPGA. In some implementations, the processors of the processing logic 1302 may share certain resources, such as for example busses, level 1 (L1) caches, and/or level 2(L2) caches. The instructions executed by the processing logic 1302 may be stored on a computer-readable storage medium, for example, in the form of a computer program. The computer-readable storage medium may be non-transitory. In some cases, the computer readable medium may be part of the memory 1310.

The memory 1310 may include either volatile or non-volatile, or both volatile and non-volatile types of memory. The memory 1310 may, for example, include random access memory (RAM), read only memory (ROM), Electrically Erasable Programmable Read-Only Memory (EEPROM), flash memory, and/or some other suitable storage media. In some cases, some or all of the memory 1310 may be internal to the network adapter device 1300, while in other cases some or all of the memory may be external to the network adapter device 1300.

In some implementations, the configuration module 1304 may include one or more configuration registers. Configuration registers may control the operations of the network adapter device 1300. In some implementations, one or more bits in the configuration register can represent certain capabilities of the network adapter device 1300. Configuration registers may be programmed by instructions executing in the processing logic 1302, and/or by an external entity, such as a host device, an operating system executing on a host device, and/or a remote server. The configuration module 1304 may further include hardware and/or software that control the operations of the network adapter device 1300.

In some implementations, the management module 1306 may be configured to manage different components of the network adapter device 1300. In some cases, the management module 1306 may configure one or more bits in one or more configuration registers at power up, to enable or disable certain capabilities of the network adapter device 1300.

The bus interface module 1308 may enable communication with external entities, such as a host device and/or other components in a computing system, over an external communication medium. The bus interface module 1308 may include a physical interface for connecting to a cable, socket, port, or other connection to the external communication medium. The bus interface module 1308 may further include hardware and/or software to manage incoming and outgoing transactions. The bus interface module 1308 may implement a local bus protocol, such as NVMe, AHCI, SCSI, SAS, SATA, PATA, PCI/PCIe, and the like. The bus interface module 1308 may include at least the physical layer for any of these bus protocols, including a connector, power management, error handling, etc. In some implementations, the network adapter device 1300 may include multiple bus interface modules for communicating with multiple external entities. These multiple bus interface modules may implement the same local bus protocol, different local bus protocols, or a combination of the same and different bus protocols.

The network interface module 1312 may include hardware and/or software for communicating with a network. This network interface module 1312 may, for example, include physical connectors for wired connection to a network, and/or antennas for wireless communication to a network. The network interface module 1312 may further include hardware and/or software configured to implement a network protocol stack. The network interface module 1312 may communicate with the network using a network protocol, such as for example TCP/IP, InfiniBand, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network adapter device 1300 may include multiple network interface modules, each configured to communicate with a different network. For example, in these implementations, the network adapter device 1300 may include a network interface module for communicating with a wired Ethernet network, a wireless 802.11 network, a cellular network, an InfiniBand network, etc.

Network adapter device 1300 may be implemented as one of a system-on-chip (SOC), a processor, a network interface card (NIC), a switch application specific integrated circuit (ASIC), or a field programmable gate array (FPGA).

Figure 14:
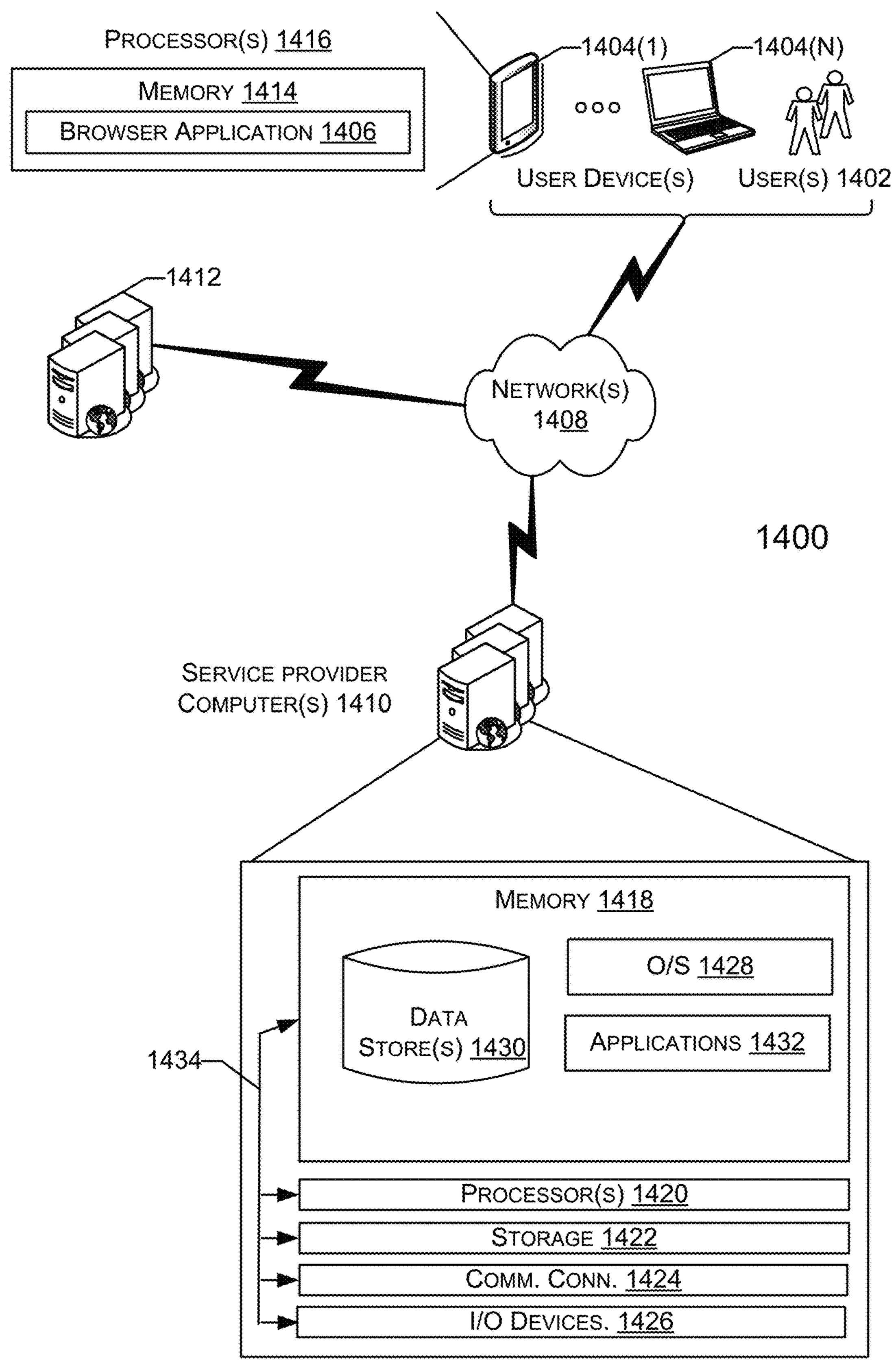
FIG. 14 illustrates an example architecture for features and systems described herein that includes one or more service provider computers and/or a user device connected via one or more networks, according to some embodiments.

FIG. 14 illustrates an example architecture for features and systems described herein that includes one or more service provider computers and/or a user device connected via one or more networks. The devices discussed in FIGS. 1-13 may use one or more components of the computing devices described in FIG. 14 or may represent one or more computing devices described in FIG. 14. In illustrated architecture 1400, one or more users 1402 may use user computing devices 1404(1)-(N) to access an application 1406 (e.g., a web browser or mobile device application), via one or more networks 1408. In some aspects, application 1406 may be hosted, managed, and/or provided by a computing resources service or service provider. One or more service provider computers 1410 may provide a native application that is configured to run on user devices 1404, which user(s) 1402 may interact with. Service provider computer(s) 1410 may, in some examples, provide computing resources such as, but not limited to, client entities, low latency data storage, durable data storage, data access, management, virtualization, cloud-based software solutions, electronic content performance management, and so on. Service provider computer(s) 1410 may also be operable to provide web hosting, computer application development and/or implementation platforms, combinations of the foregoing or the like to user(s) 1402. Service provider computer(s) 1410, in some examples, may communicate with one or more third party computers 1412.

In some examples, network(s) 1408 may include any one or a combination of many different types of networks, such as cable networks, the Internet, wireless networks, cellular networks and other private and/or public networks. While the illustrated example represents user(s) 1402 accessing an application 1406 over network(s) 1408, the described techniques may equally apply in instances where user(s) 1402 interact with the service provider computer(s) 1410 via user device(s) 1404 over a landline phone, via a kiosk or in some other manner. The described techniques may also apply in other client/server arrangements (e.g., set-top boxes, etc.), as well as in non-client/server arrangements (e.g., locally stored applications, etc.).

As described briefly above, application 1406 may allow user(s) 1402 to interact with service provider computer(s) 1410 to, for example, access web content (e.g., web pages, music, video, etc.). Service provider computer(s) 1410, which may be arranged in a cluster of servers or as a server farm, may host application 1406 and/or cloud-based software services. Other server architectures may also be used to host application 1406. Application 1406 may be capable of handling requests from many users 1402 and serving, in response, various item web pages. Application 1406 can provide any type of website that supports user interaction, including social networking sites, online retailers, informational sites, blog sites, search engine sites, news and entertainment sites, and so forth. As discussed above, the described techniques can similarly be implemented outside of application 1406, such as with other applications running on user device(s) 1404.

User device(s) 1404 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1404 may be in communication with service provider computer(s) 1410 via network(s) 1408, or via other network connections. Additionally, user device(s) 1404 may be part of the distributed system managed by, controlled by, or otherwise part of service provider computer(s) 1410 (e.g., a console device integrated with service provider computers 1410).

In one illustrative configuration, a user device(s) 1404 may include at least one memory 1414 and one or more processing units (or processor(s) 1416). Processor(s) 1416 may be implemented in hardware, computer-executable instructions, firmware, or combinations thereof. Computer-executable instruction or firmware implementations of processor(s) 1416 may include computer-executable or machine-executable instructions written in any suitable programming language to perform the various functions described. User device(s) 1404 may also include geo-location devices (e.g., a global positioning system (GPS) device or the like) for providing and/or recording geographic location information associated with user device(s) 1404.

Memory 1414 may store program instructions that are loadable and executable on processor(s) 1416, as well as data generated during the execution of these programs. Depending on the configuration and type of user device(s) 1404, memory 1414 may be volatile (such as random access memory (RAM)) and/or non-volatile (such as read-only memory (ROM), flash memory, etc.). User device(s) 1404 may also include additional removable storage and/or non-removable storage including, but not limited to, magnetic storage, optical disks and/or tape storage. The disk drives and their associated computer-readable media may provide non-volatile storage of computer-readable instructions, data structures, program modules, and other data for the computing devices. In some implementations, memory 1414 may include multiple different types of memory, such as static random access memory (SRAM), dynamic random access memory (DRAM), or ROM.

Turning to the contents of memory 1414 in more detail, memory 1414 may include an operating system and one or more application programs or services for implementing the features disclosed herein including at least a user provided input element or electronic service web page, such as via a browser application 1406 or dedicated applications (e.g., smart phone applications, tablet applications, etc.). Browser application 1406 may be configured to receive, store and/or display a website or other interface for interacting with service provider computer(s) 1410. Additionally, memory 1414 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user-provided response to a security question or a geographic location obtained by user device 1404.

In some aspects, service provider computer(s) 1410 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1410 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1410 may be in communication with user device(s) 1404 and/or other service providers via network(s) 1408, or via other network connections. Service provider computer(s) 1410 may include one or more servers, perhaps arranged in a cluster, as a server farm, or as individual servers not associated with one another. These servers may be configured as part of an integrated, distributed computing environment.

In one illustrative configuration, service provider computer(s) 1410 may include at least one memory 1418 and one or more processing units (or processors 1420). Processor(s) 1420 may be any processing logic implemented in hardware, computer-executable instructions, firmware, or combinations thereof. Computer-executable instruction or firmware implementations of processor(s) 1420 may include computer-executable or machine-executable instructions written in any suitable programming language to perform the various functions described.

In some instances, hardware processor(s) 1420 may be a single core processor or a multi-core processor. A multi-core processor may include multiple processing units within the same processor. In some embodiments, the multi-core processors may share certain resources, such as buses and second or third level of caches. In some instances, each core in a single or multi-core processor may also include multiple executing logical processors (or threads). In such a core (e.g., those with multiple logical processors), several stages of the execution pipeline and also lower level caches may also be shared.

Memory 1418 may store program instructions that are loadable and executable on processor(s) 1420, as well as data generated during the execution of these programs. Depending on the configuration and type of service provider computer(s) 1410, memory 1418 may be volatile (such as RAM) and/or non-volatile (such as ROM, flash memory, etc.). Service provider computer(s) 1410 or servers may also include additional storage 1422, which may include removable storage and/or non-removable storage. Additional storage 1422 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, memory 1418 may include multiple different types of memory, such as SRAM, DRAM, or ROM.

Memory 1418 and additional storage 1422, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. Memory 1418 and additional storage 1422 are all examples of computer storage media. Additional types of computer storage media that may be present in service provider computer(s) 1410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1410. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1410 may also contain communications connection(s) 1424 that allow the service provider computer(s) 1410 to communicate with a stored database, another computing device or server, user terminals and/or other devices on network(s) 1408. Service provider computer(s) 1410 may also include I/O device(s) 1426, such as a keyboard, a mouse, a pen, a voice input device, a touch input device, a display, speakers, a printer, and the like. Communication connection(s) 1424 and I/O device(s) 1426, along with storage 1422, may be described as peripheral devices.

Memory 1418 may include an operating system 1428, one or more data stores 1430 and/or one or more application programs 1432 or services for implementing the features disclosed herein.

Service provider computer(s) 1410 may also include one or more communication channels 1434. A communication channel 1434 may provide a medium over which the various components of service provider computer 1410 can communicate. Communication channel or channels 1434 may take the form of a bus, a ring, a switching fabric, or a network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 14, and/or functions described herein can be provided by one or more modules that exist as separate modules and/or module functions described herein can be spread over multiple modules.

Figure 15:
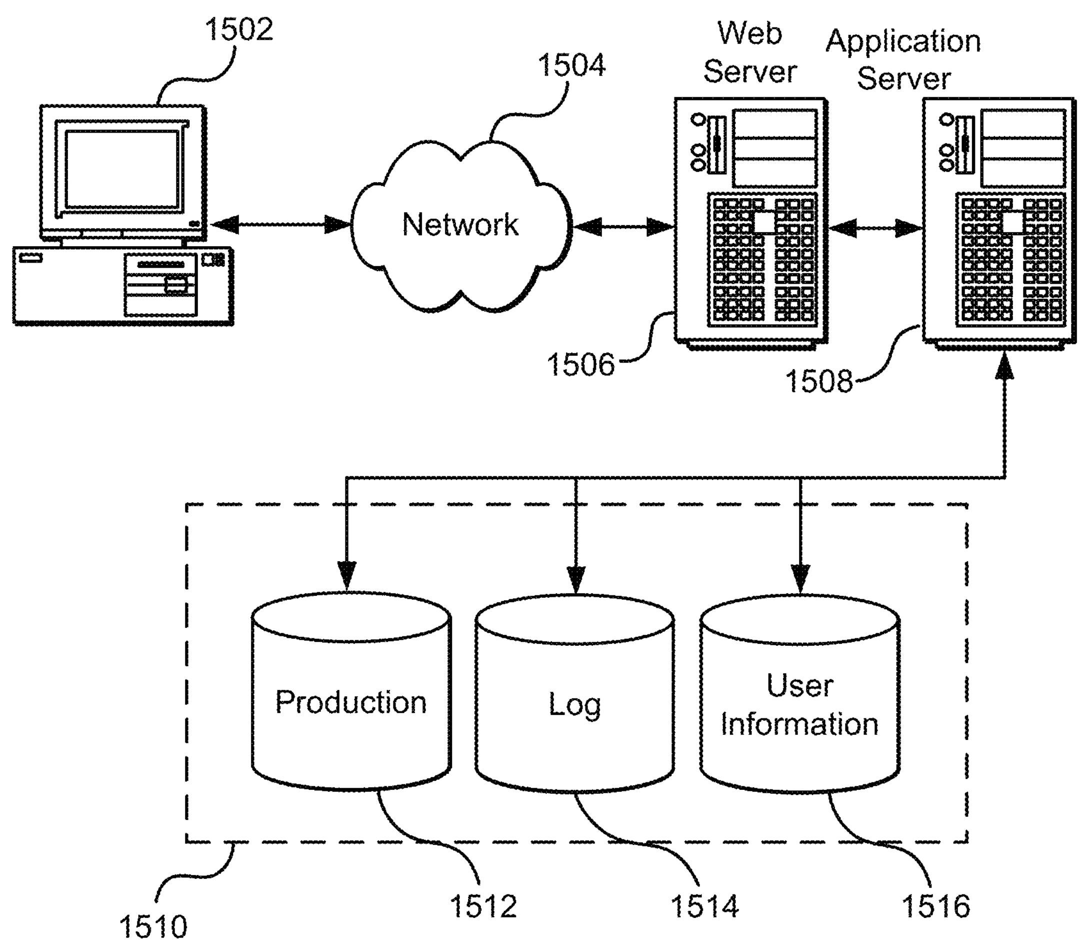
FIG. 15 illustrates an environment in which various embodiments can be implemented.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:

receiving, at a network adapter of a first network endpoint device, a data stream from a user application executing on the first network endpoint device, the network adapter having one or more physical ports in communication with a network, wherein the data stream is to be transmitted to a second network endpoint device, wherein the first network endpoint device is associated with a source address on the network, wherein the second network endpoint device is associated with a destination address on the network;

splitting the data stream into packets according to a transport service of a transport layer, wherein splitting the data stream into the packets includes generating headers for the packets;

assigning a set of the packets to a particular flowlet from a plurality of flowlets maintained by the transport layer, wherein each flowlet of the plurality of flowlets uses a different path over the network when transmitting the respective packets assigned to the flowlet, wherein all the respective packets assigned to the flowlet use a same path over the network between the first network endpoint device and the second network endpoint device, and wherein a number of flowlets in use is dynamically adjusted when assigning the set of the packets to the particular flowlet;

modifying a field in headers of the set of the packets, wherein the field is used to route the set of the packets over the network, wherein modification of the field causes each of the set of the packets to be routed according to a path over the network associated with the particular flowlet; and sending, using the one or more physical ports, the set of the packets over the network according to the transport service.

2. The method of claim 1, wherein the field being modified is a protocol optional field.

3. The method of claim 2, wherein the protocol optional field is a source port field.

4. The method of claim 1, wherein the packets being transmitted on different paths have the same source address, destination address, and destination port.

5. The method of claim 1, wherein each packet of the set of the packets includes at least one of a flowlet index or a packet sequence number.

6. The method of claim 5, wherein the second network endpoint device obtains the flowlet index or the packet sequence number of a received packet from a header of the received packet.

7. An integrated circuit device comprising:

processing logic; and a memory coupled to the processing logic and storing program code, which when executed by the processing logic, implements operations including:

receiving a message from a user application to be transmitted to a network endpoint device associated with a destination address on a network;

splitting the message into packets according to a transport service of a transport layer;

assigning a set of the packets to a particular flowlet from a plurality of flowlets maintained by the transport layer and dynamically adjusting a number of flowlets in use when assigning the set of the packets to the particular flowlet, wherein each flowlet of the plurality of flowlets uses a different path over the network when transmitting the respective packets assigned to the flowlet, and wherein all the respective packets assigned to the flowlet use a same path over the network to reach the network endpoint device;

modifying a field in headers of the set of the packets, wherein the field is used to route the set of the packets over the network, wherein modification of the field causes each of the set of the packets to be routed according to a path over the network associated with the particular flowlet; and sending the set of the packets over the network according to the transport service.

8. The integrated circuit device of claim 7, wherein the field being modified is a protocol optional field.

9. The integrated circuit device of claim 8, wherein the protocol optional field is a source port field.

10. The integrated circuit device of claim 7, wherein the packets being transmitted on different paths have the same source address, destination address, and destination port.

11. The integrated circuit device of claim 7, wherein the operations further include keeping a number of active packets in each of the plurality of flowlets below a threshold.

12. The integrated circuit device of claim 11, wherein the threshold is adjustable based on network congestion.

13. A computing device comprising:

a processor;

a memory coupled to the processor and storing a user application; and a network adapter coupled to the processor and having one or more ports in communication with a network, wherein the network adapter is operable to:

receive data from the user application to be transmitted to a network endpoint device associated with a destination address on the network;

split the data into packets according to a transport service of a transport layer;

assign a set of the packets to a particular flowlet from a plurality of flowlets maintained by the transport layer and dynamically adjust a number of flowlets in use when assigning the set of the packets to the particular flowlet, wherein each flowlet of the plurality of flowlets uses a different path over the network when transmitting the respective packets assigned to the flowlet, and wherein all the respective packets assigned to the flowlet use a same path over the network to reach the network endpoint device;

modify a field in headers of the set of the packets, wherein the field is used to route the set of the packets over the network, wherein modification of the field causes each of the set of the packets to be routed according to a path over the network associated with the particular flowlet; and send the set of the packets over the network according to the transport service.

14. The computing device of claim 13, wherein the field being modified is a protocol optional field.

15. The computing device of claim 14, wherein the protocol optional field is a source port field.

16. The computing device of claim 13, wherein the packets being transmitted on different paths have the same source address, destination address, and destination port.

17. The computing device of claim 13, wherein the network adapter is further operable to select the particular flowlet from among the plurality of flowlets based on at least one of:

a number of active packets in each flowlet of the plurality of flowlets;

a latency of each flowlet of the plurality of flowlets;

a drop rate of each flowlet of the plurality of flowlets;

information provided by the user application; or an indication from the user application regarding how the packets are to be assigned to the plurality of flowlets.

18. The computing device of claim 13, wherein each packet of the set of the packets includes at least one of a flowlet index or a packet sequence number.

19. The computing device of claim 13, wherein the network adapter is implemented using a system-on-chip (SOC), a network interface card (NIC), an application specific integrated circuit (ASIC), or a field programmable gate array (FPGA).

* * * * *